United States Patent
Endo et al.

(10) Patent No.: US 12,289,052 B2
(45) Date of Patent: Apr. 29, 2025

(54) INTEGRATED CIRCUIT AND POWER SUPPLY CIRCUIT

(71) Applicant: FUJI ELECTRIC CO., LTD., Kawasaki (JP)

(72) Inventors: Yuta Endo, Matsumoto (JP); Jun Yabuzaki, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 226 days.

(21) Appl. No.: 17/950,832

(22) Filed: Sep. 22, 2022

(65) Prior Publication Data

US 2023/0143191 A1 May 11, 2023

(30) Foreign Application Priority Data

Nov. 9, 2021 (JP) ................................ 2021-182442

(51) Int. Cl.
*H02M 3/335* (2006.01)
*H02M 1/08* (2006.01)

(52) U.S. Cl.
CPC ......... *H02M 3/33523* (2013.01); *H02M 1/08* (2013.01)

(58) Field of Classification Search
CPC ...... H02M 3/33523; H02M 1/00; H02M 1/08; H02M 1/34
USPC ...................... 363/21.01, 21.07, 21.08, 21.12
See application file for complete search history.

(56) References Cited

U.S. PATENT DOCUMENTS

| | | | |
|---|---|---|---|
| 2021/0242766 A1* | 8/2021 | Sugawara | H02M 3/335 |
| 2022/0038009 A1* | 2/2022 | Maruyama | H02M 1/0029 |
| 2023/0051610 A1* | 2/2023 | Matsumoto | H02M 1/4225 |
| 2023/0124433 A1* | 4/2023 | Yamane | H02M 1/0032 363/21.12 |

FOREIGN PATENT DOCUMENTS

JP   2021-108517 A   7/2021

* cited by examiner

*Primary Examiner* — Yemane Mehari
(74) *Attorney, Agent, or Firm* — Rabin & Berdo, P.C.

(57) ABSTRACT

An integrated circuit for a power supply circuit that generates an output voltage from an input voltage. The power supply circuit includes a transformer, a transistor controlling an inductor current flowing through a primary coil of the transformer, a first capacitor, and a first diode charging the first capacitor. The integrated circuit is configured to control switching of the transistor. The integrated circuit includes a first terminal configured to receive a voltage across the first capacitor; a second terminal configured to receive a feedback voltage corresponding to the output voltage; a driving signal output circuit configured to output a driving signal to increase a switching period of the transistor, in response to a decrease in a load current; a driver circuit configured to drive the transistor in response to the driving signal; and a determination circuit configured to determine whether the power supply voltage drops below a first voltage.

9 Claims, 13 Drawing Sheets

INTEGRATED CIRCUIT AND POWER SUPPLY CIRCUIT

CROSS-REFERENCE TO RELATED APPLICATIONS

The present application claims priority pursuant to 35 U.S.C. § 119 from Japanese patent application number 2021-182442 filed on Nov. 9, 2021, the entire disclosure of which is hereby incorporated by reference herein.

BACKGROUND

Technical Field

The present disclosure relates to an integrated circuit and a power supply circuit.

Description of the Related Art

Power supply circuits may include an integrated circuit that controls switching of a power transistor in a power supply circuit using a power supply voltage generated from a voltage from an auxiliary coil of a transformer (for example, Japanese Patent Application Publication No. 2021-108517).

In general, the voltage across the auxiliary coil is generated with the integrated circuit switching the power transistor. Accordingly, for example, when the current flowing through a load of a power supply circuit decreases and the switching period of the power transistor increases, the voltage across the auxiliary coil drops and the power supply voltage may drop.

Then, when the power supply voltage drops, the so-called under voltage protection circuit may operate and reset the integrated circuit.

SUMMARY

A first aspect of an embodiment of the present disclosure is an integrated circuit for a power supply circuit that generates an output voltage from an input voltage thereof, to apply the output voltage to a load, the power supply circuit including a transformer including a primary coil, a secondary coil, and an auxiliary coil, a transistor configured to control an inductor current flowing through the primary coil, a first capacitor, a first diode configured to charge the first capacitor, based on a voltage across the auxiliary coil, upon turning off of the transistor, a booster circuit configured to generate a boost voltage, based on the voltage across the auxiliary coil, and a first charging circuit configured to charge the first capacitor, the integrated circuit being configured to control switching of the transistor, the integrated circuit comprising: a first terminal configured to receive a voltage across the first capacitor as a power supply voltage; a second terminal configured to receive a feedback voltage corresponding to the output voltage; a driving signal output circuit configured to output a driving signal based on the feedback voltage to increase a switching period of the transistor, in response to a decrease in a load current flowing through the load; a driver circuit configured to drive the transistor in response to the driving signal; and a determination circuit configured to determine whether the power supply voltage drops below a first voltage, so that the first charging circuit charges the first capacitor, based on the boost voltage, when the power supply voltage is lower than the first voltage.

A second aspect of an embodiment of the present disclosure is a power supply circuit configured to generate an output voltage from an input voltage thereof, to apply the output voltage to a load, the power supply circuit comprising: a transformer including a primary coil, a secondary coil, and an auxiliary coil; a transistor configured to control an inductor current flowing through the primary coil; a first capacitor; a first diode configured to charge the first capacitor, based on a voltage across the auxiliary coil, upon turning off of the transistor; a booster circuit configured to generate a boost voltage, based on the voltage across the auxiliary coil; a first charging circuit configured to charge the first capacitor; and an integrated circuit configured to control switching of the transistor, the integrated circuit including a first terminal configured to receive a voltage across the first capacitor as a power supply voltage, a second terminal configured to receive a feedback voltage corresponding to the output voltage, a driving signal output circuit configured to output a driving signal to change a switching period of the transistor, based on the feedback voltage, a driver circuit configured to drive the transistor in response to the driving signal, and a determination circuit configured to determine whether the power supply voltage drops below a first voltage, wherein the first charging circuit is configured to charge the first capacitor based on the boost voltage, when the power supply voltage is lower than the first voltage.

A third aspect of an embodiment of the present disclosure is a power supply circuit configured to generate an output voltage from an input voltage thereof, to apply the output voltage to a load, the power supply circuit comprising: a transformer including a primary coil, a secondary coil, and an auxiliary coil; a transistor configured to control an inductor current flowing through the primary coil; a first capacitor; a first diode configured to charge the first capacitor, based on a voltage across the auxiliary coil, upon turning off of the transistor; a determination circuit configured to determine whether a voltage across the first capacitor drops below a first voltage; a booster circuit configured to generate a boost voltage, based on the voltage across the auxiliary coil; a first charging circuit configured to charge the first charging circuit, based on the boost voltage, when the voltage across the first capacitor is lower than the first voltage; and an integrated circuit configured to control switching of the transistor, the integrated circuit including a first terminal configured to receive the voltage across the first capacitor as a power supply voltage, a second terminal configured to receive a feedback voltage corresponding to the output voltage, a driving signal output circuit configured to output a driving signal to change a switching period of the transistor, based on the feedback voltage, and a driver circuit configured to drive the transistor in response to the driving signal.

BRIEF DESCRIPTION OF THE DRAWINGS

FIG. 7 is a diagram illustrating a configuration example of a current output circuit 39a.

DETAILED DESCRIPTION

At least following matters will become apparent from the descriptions of the present specification and the accompanying drawings.

Embodiments

Figure 1:
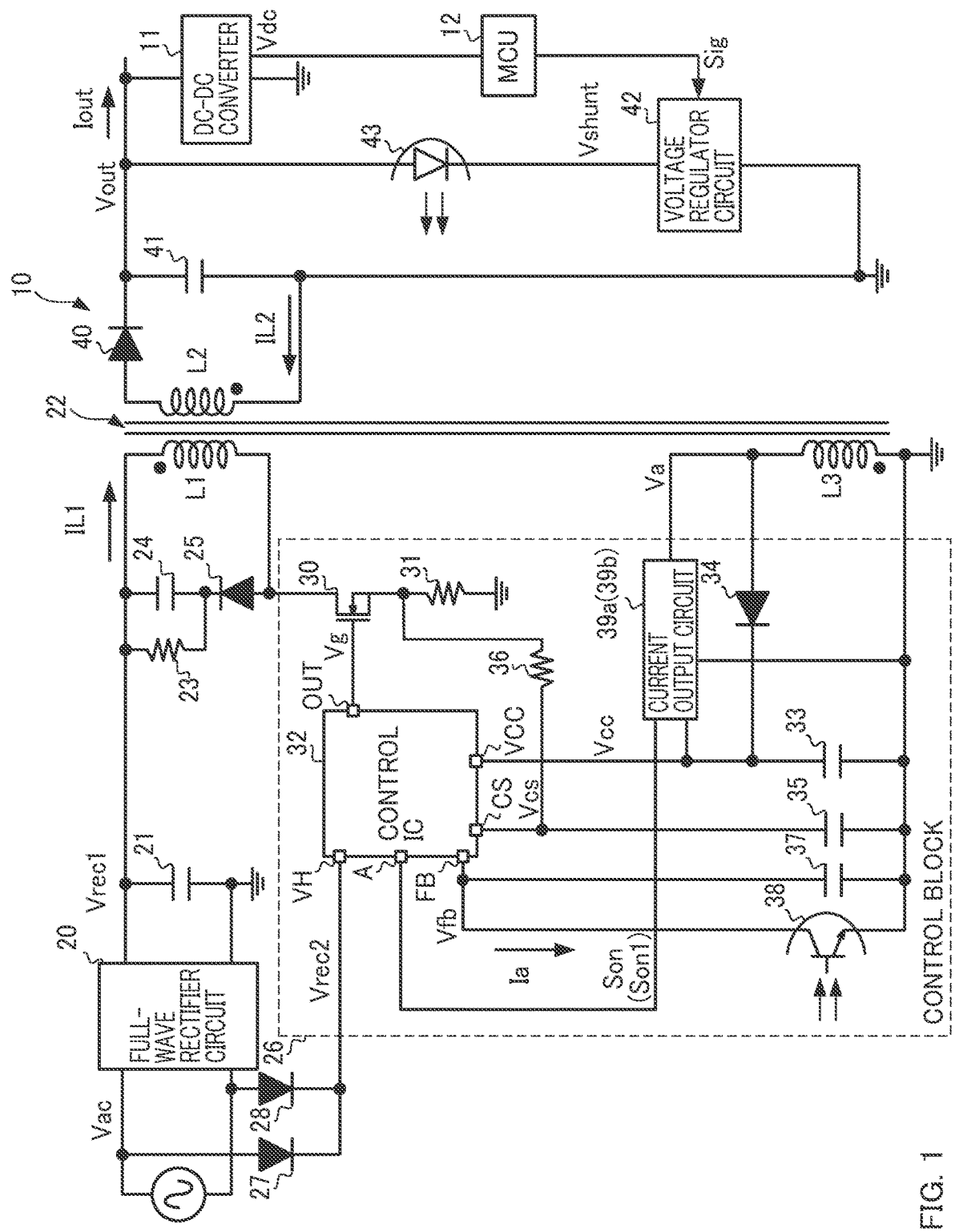
FIG. 1 is a diagram illustrating a configuration example of an AC-DC converter 10.

FIG. 1 is a diagram illustrating a configuration example of an AC-DC converter 10, which is an embodiment of the present disclosure. The AC-DC converter 10 is a power supply circuit that generates an output voltage Vout from an alternating current (AC) voltage Vac of a commercial power supply.

<<Overview of AC-DC Converter 10>>

The AC-DC converter 10 includes a full-wave rectifier circuit 20, capacitors 21, 24, and 41, a transformer 22, a resistor 23, diodes 25, 27, 28, and 40, a control block 26, a voltage regulator circuit 42, and a light-emitting diode 43.

A DC-DC converter 11 is a load that is coupled to the AC-DC converter 10 and is supplied with power by the AC-DC converter 10, and receives the output voltage Vout. Note that the current flowing through the DC-DC converter 11 is referred to as load current Tout.

In addition, the DC-DC converter 11 applies a direct-current (DC) voltage Vdc to a Micro Controller Unit (MCU) 12. The MCU 12 outputs a signal Sig, to cause the voltage regulator circuit 42 (described later) to change the level of a DC voltage Vshunt, in response to the signal Sig. In this case, the AC-DC converter 10 outputs the high output voltage Vout or the low output voltage Vout, which will be described later in detail.

The full-wave rectifier circuit 20 full-wave rectifies the predetermined AC voltage which is an input voltage inputted thereto, and applies a resultant voltage, as a voltage Vrec1, to a primary coil L1 of the transformer 22, the capacitors 21 and 24, and the resistor 23. The capacitor 21 smooths the voltage Vrec1. Note that the AC voltage Vac has, for example, an effective level in a range of 100 V to 240 V and a frequency in a range of 50 Hz to 60 Hz.

The transformer 22 includes the primary coil L1 provided on the input side, a secondary coil L2 magnetically coupled to the primary coil L1, and an auxiliary coil L3 magnetically coupled to the secondary coil L2. Here, windings of the secondary coil L2 and the auxiliary coil L3 are formed such that voltages generated across the secondary coil L2 and the auxiliary coil L3 are opposite in polarity to a voltage generated across the primary coil L1. Further, the primary coil L1 and the auxiliary coil L3 are provided on the input side (primary side), and the secondary coil L2 is provided on the output side (secondary side).

The resistor 23, the capacitor 24, and the diode 25 configure a snubber circuit. The snubber circuit suppresses a surge voltage caused by a leakage inductance of the primary coil L1 when a power transistor 30 (described later) is off, to thereby minimize breakage of the power transistor 30. Further, the snubber circuit is coupled in parallel with the primary coil L1. The diode 25 has an anode coupled to the high potential side of the power transistor 30 described later and a cathode coupled to the resistor 23. Furthermore, the capacitor 24 is coupled in parallel with the resistor 23.

The control block 26 controls an inductor current IL1 flowing through the primary coil L1 on the primary side of the transformer 22, to thereby control the voltage generated across the secondary coil L2 on the secondary side of the transformer 22. As result, the output voltage Vout is generated on the secondary side of the transformer 22.

The diodes 27 and 28 full-wave rectify the AC voltage Vac, to generate a rectified voltage Vrec2. Note that the rectified voltage Vrec2 is applied to a terminal VH of a control IC 32 (described later) included in the control block 26.

The diode 40 rectifies an inductor current IL2 from the secondary coil L2 of the transformer 22, to supply a resultant current to the capacitor 41. The capacitor 41 is charged with a current from the diode 40, and thus the output voltage Vout is generated across the terminals of the capacitor 41.

The voltage regulator circuit 42 generates a constant DC voltage, and is configured using a shunt regulator, for example. When the DC-DC converter 11 is a power supply circuit used for a printer (not illustrated), for example, the voltage regulator circuit 42 outputs the high DC voltage Vshunt, in response to the signal Sig from the MCU 12 indicating that the printer is operating. Meanwhile, the voltage regulator circuit 42 outputs the low DC voltage Vshunt, in response to the signal Sig from the MCU 12 indicating that the printer is in standby mode.

The light-emitting diode 43 is a device that emits light having an intensity corresponding to the difference between the output voltage Vout and the voltage Vshunt from the voltage regulator circuit 42, and configures a photocoupler together with a phototransistor 38 described later. In an embodiment of the present disclosure, the intensity of the light from the light-emitting diode 43 increases with a rise in the level of the output voltage Vout.

<<Overview of Control Block 26>>

The control block 26 controls the AC-DC converter 10. The control block 26 includes the power transistor 30, resistors 31 and 36, the control IC 32, capacitors 33, 35, and 37, a diode 34, the phototransistor 38, and a current output circuit 39a.

The power transistor 30 is an N-channel metal-oxide-semiconductor (NMOS) transistor to control power supplied to the DC-DC converter 11, and controls the inductor current IL1 flowing through the primary coil. It is assumed, in an embodiment of the present disclosure, that the power transistor 30 is a metal-oxide-semiconductor (MOS) transistor, however, it is not limited thereto. The power transistor 30 may be, for example, a bipolar transistor or the like, as long as it is a transistor capable of controlling power.

The resistor 31 detects the inductor current IL1 flowing through the primary coil L1 (i.e., the current flowing through the power transistor 30) when the power transistor 30 is on.

The resistor 31 has one end coupled to the source electrode of the power transistor 30, and the other end grounded.

The control IC 32 is an integrated circuit that switches the power transistor 30, to thereby generate the output voltage Vout. Specifically, the control IC 32 switches the power transistor 30, based on the inductor current IL1 and a feedback voltage Vfb.

Note that the control IC 32 has terminals CS, FB, OUT, VCC, VH, and A, and details of the control IC 32 will be described later. The gate electrode of the power transistor 30 is coupled to the terminal OUT such that the power transistor 30 is switched using a drive voltage Vg. Further, although the control IC 32 has other terminals in actuality, a description thereof is omitted, for convenience.

The capacitor 33 is provided between the terminal VCC and one end of the auxiliary coil L3. The diode 34 has an anode coupled to the auxiliary coil L3, and a cathode coupled to the terminal VCC. Further, the diode 34 charges the capacitor 33 based on a voltage Va at the other end of the auxiliary coil L3. Note that the end of the auxiliary coil L3 is grounded.

In addition, the voltage Va generated across the auxiliary coil L3 is applied to the capacitor 33 through the diode 34. Note that the capacitor 33, which receives the voltage based on the voltage Va across the auxiliary coil L3 when the power transistor 30 is off, is coupled to the terminal VCC, and this voltage results in a power supply voltage Vcc.

In other words, the voltage across the capacitor 33 is applied to the terminal VCC as the power supply voltage Vcc. Note that the capacitor 33 corresponds to a "first capacitor", the diode 34 corresponds to a "first diode", and the terminal VCC corresponds to a "first terminal".

The capacitor 35 is provided between the terminal CS and the ground, to receive, through the resistor 36, the voltage across the resistor 31 that is generated with the inductor current IL1 flowing. Note that the capacitor 35 and the resistor 36 configure a low-pass filter, to thereby stabilize a voltage Vcs at the terminal CS.

The capacitor 37 is provided between the terminal FB and the ground, to stabilize a voltage Vfb at the terminal FB. Further, the voltage Vfb is a feedback voltage corresponding to the output voltage Vout, and is applied to the terminal FB.

Note that the control IC 32 turns on the power transistor 30 at a frequency corresponding to the voltage Vfb, which will be described later in detail. Then, in response to the voltage Vcs exceeding the voltage Vfb while the power transistor 30 is on, the control IC 32 turns off the power transistor 30.

The phototransistor 38 is provided between the terminal FB and the ground, to receive the light from the light-emitting diode 43. The intensity of the light emitted by the light-emitting diode 43 becomes greater, the phototransistor 38 passes a larger sink current Ia to the terminal FB by. As a result, the feedback voltage Vfb drops, which will be described later in detail. Note that the terminal FB corresponds to a "second terminal".

The current output circuit 39a operates so as to charge the capacitor 33 in response to a drop in the power supply voltage. The details of the current output circuit 39a will be described later.

<<Configuration of Control IC 32>>

Figure 2:
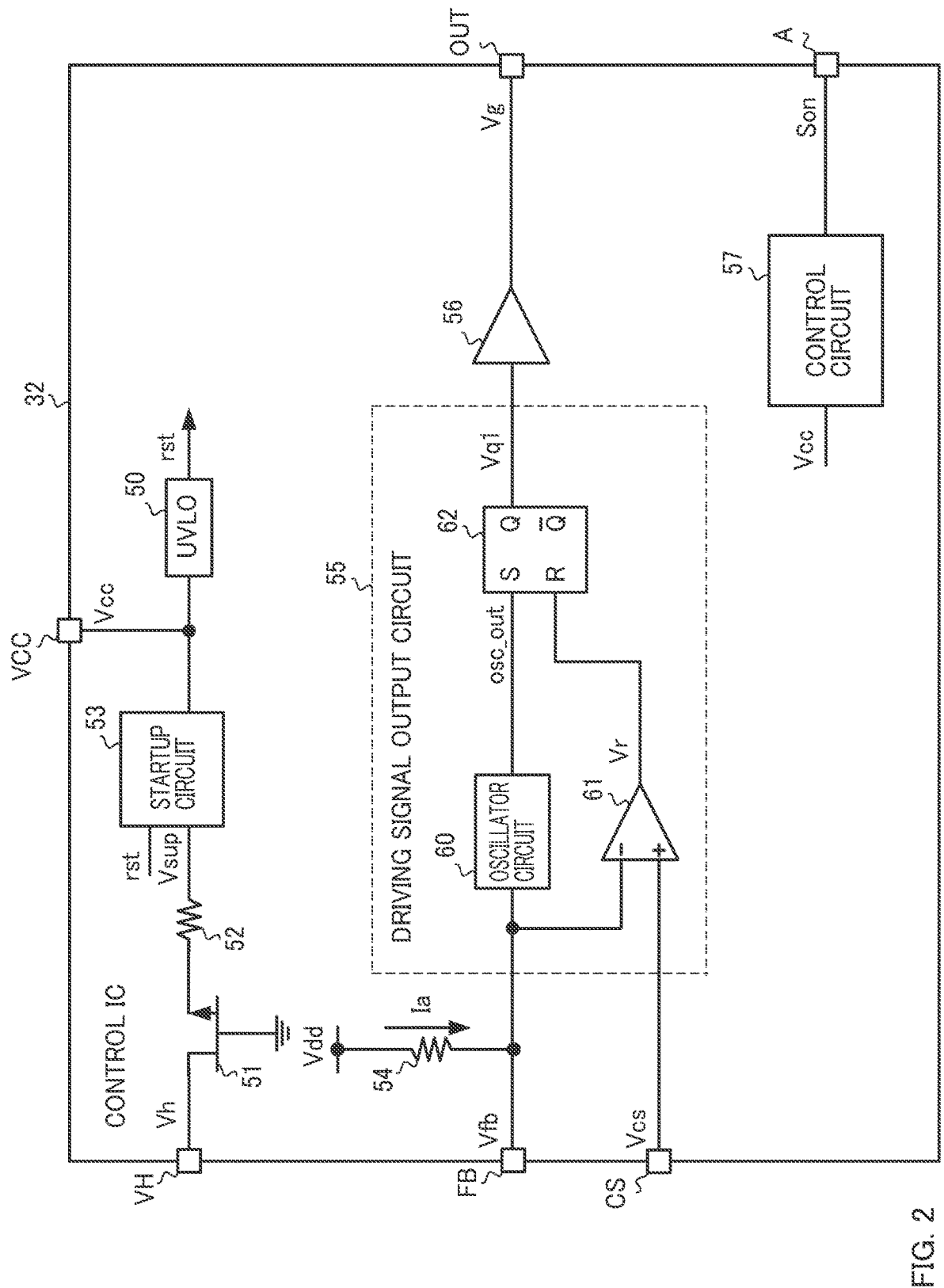
FIG. 2 is a diagram illustrating a configuration example of a control IC 32.

FIG. 2 is a diagram illustrating a configuration example of the control IC 32. The control IC 32 switches the power transistor 30, to thereby generate the output voltage Vout. Specifically, the control IC 32 switches the power transistor 30, based on the voltage Vcs corresponding to the inductor current IL1 and the feedback voltage Vfb.

The control IC 32 includes an under voltage protection circuit (undervoltage-lockout (UVLO)) 50, a startup element 51, a resistors 52, 54, a startup circuit 53, a driving signal output circuit 55, a driver circuit 56, and a control circuit 57.

==Under Voltage Protection Circuit (UVLO) 50==

The under voltage protection circuit 50 outputs a signal rst based on the power supply voltage Vcc. Specifically, the under voltage protection circuit 50 outputs the signal rst of a high level (hereinafter, referred to as high or high level) to stop switching the power transistor 30, in response to the power supply voltage Vcc reaching a predetermined level Voff.

Meanwhile, the under voltage protection circuit 50 outputs the signal rst of a low level (hereinafter, referred to as low or low level) to allow switching of the power transistor 30, in response to the power supply voltage Vcc reaching a predetermined level Von higher than the predetermined level Voff, during the operation of the startup circuit 53 (described later).

==Startup Element 51, Resistor 52==

The startup element 51 generates a predetermined voltage from the current based on a voltage Vh (i.e., the rectified voltage Vrec2) applied to the terminal VH. The resistor 52 is an element to limit the current at the time when the startup circuit 53 charges the capacitor 33 of FIG. 1 through the terminal VCC. Further, the resistor 52 generates a voltage Vsup at one end thereof, upon receiving a predetermined voltage at the other end thereof. Note that the terminal VH corresponds to a "third terminal".

==Overview of Startup Circuit 53==

For example, when the under voltage protection circuit 50 outputs the high signal rst, the startup circuit 53 outputs a current to charge the capacitor 33 of FIG. 1 through the terminal VCC at the voltage Vsup corresponding to the voltage Vh. Meanwhile, when the under voltage protection circuit 50 outputs the low signal rst, the startup circuit 53 stops operating.

Specifically, in response to the power supply voltage Vcc dropping below the predetermined level Voff (e.g., upon startup of the control IC 32), the under voltage protection circuit 50 outputs the high signal rst. In this case, the startup circuit 53 outputs the current in response to the high signal rst. Further, the startup circuit 53 stops operating in response to the low signal rst.

==Details of Startup Circuit 53==

Figure 3:
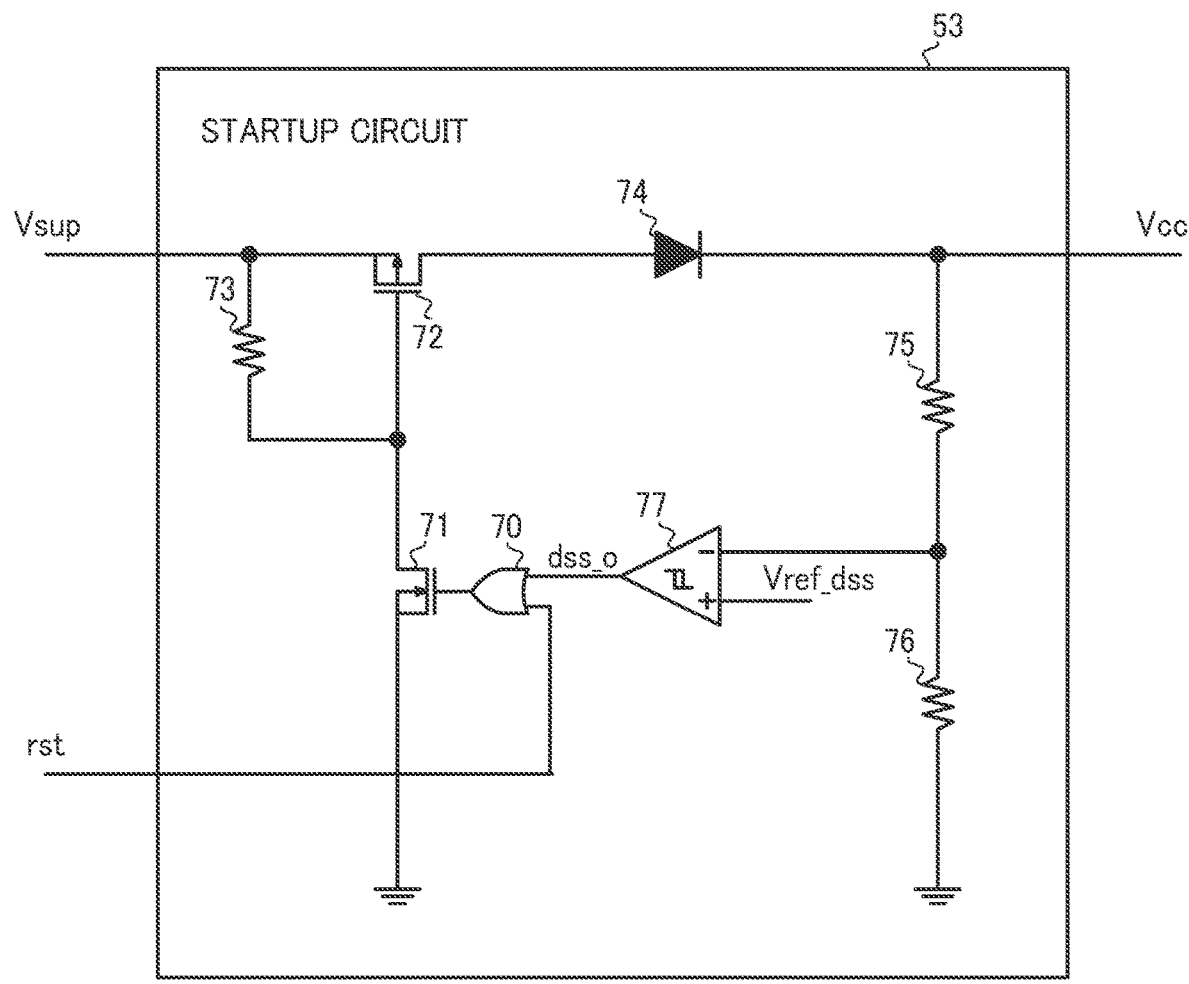
FIG. 3 is a diagram illustrating a configuration example of a startup circuit 53.

The startup circuit 53 includes, as illustrated in FIG. 3, an OR element 70, an NMOS transistor 71, a P-channel metal-oxide-semiconductor (PMOS) transistor 72, resistors 73, 75, and 76, a diode 74, and a hysteresis comparator 77.

The OR element 70 calculates the logical sum of the signal rst and an output signal dss_o of the hysteresis comparator 77, to turn on and off the NMOS transistor 71 based on a result of the calculation. Further, the OR element 70 turns on the NMOS transistor 71 upon receiving the high signal rst.

Upon being turned on, the NMOS transistor 71 causes the voltage at one end of the resistor 73 to reach a ground voltage, and turns on the PMOS transistor 72 provided between the node that receives the voltage Vsup and the anode of the diode 74.

The other end of the resistor 73 receives the voltage Vsup. Further, upon turning on of the PMOS transistor 72, the capacitor 33 of FIG. 1 is charged with the current corresponding to the voltage Vsup through the diode 74 and the terminal VCC.

Meanwhile, upon turning off of the NMOS transistor 71, the PMOS transistor 72 is turned off and the capacitor 33 is not charged.

The resistors 75 and 76 are provided in series between the terminal VCC and the ground, and configure a voltage divider circuit. The voltage at the coupling point of the resistors 75 and 76 varies with the power supply voltage Vcc, and is applied to the inverting input terminal of the hysteresis comparator 77.

A reference voltage Vref_dss is applied to the non-inverting input terminal of the hysteresis comparator 77.

Note that the hysteresis comparator 77 generates voltages of a high threshold level Vdssh and a threshold level Vdssl lower than the threshold level Vdssh, based on the reference voltage Vref_dss.

Then, in response to the voltage at the coupling point of the resistors 75 and 76 dropping below the threshold level Vdssl, the hysteresis comparator 77 outputs a high signal dss_o. Meanwhile, in response to the voltage at the coupling point of the resistors 75 and 76 exceeding the threshold level Vdssh, the hysteresis comparator 77 outputs a low signal dss_o.

With the above configuration, the startup circuit 53 receives the low signal rst, and, in response to the power supply voltage Vcc dropping below the voltage corresponding to the threshold level Vdssl, the startup circuit 53 charges the capacitor 33 such that the voltage obtained by dividing the power supply voltage Vcc is between the threshold level Vdssh and the threshold level Vdssl.

Meanwhile, for example, in response to the power supply voltage Vcc exceeding the threshold level Vdssh with a rise in the voltage Va from the auxiliary coil L3, the startup circuit 53 does not charge the capacitor 33. Note that the threshold level Vdssl is higher than the predetermined level Voff described later. Note that the threshold level Vdssl corresponds to a "second voltage", and the startup circuit 53 corresponds to a "second charging circuit".

==Resistor 54==

Returning to FIG. 2, the resistor 54 will be described. The resistor 54 have one end to receive a voltage Vdd from an internal power supply (not illustrated), and the other end coupled to the terminal FB. Further, the sink current Ia passed by the phototransistor 38 of FIG. 1 is passed through the resistor 54, to thereby generate the feedback voltage Vfb, based on the voltage generated across the resistor 54.

Specifically, upon an increase in the intensity of the light from the light-emitting diode 43, the phototransistor 38 passes the large sink current Ia to the terminal FB. Accordingly, the voltage generated across the resistor 54 rises and the feedback voltage Vfb drops. In other words, the feedback voltage Vfb corresponding to the output voltage Vout is applied to the terminal FB.

==Driving Signal Output Circuit 55==

The driving signal output circuit 55 outputs a driving signal Vq1 to change a switching period based on the feedback voltage Vfb. The driving signal output circuit 55 includes an oscillator circuit 60, a comparator 61, and an SR flip-flop 62.

===Oscillator Circuit 60===

Figure 4:
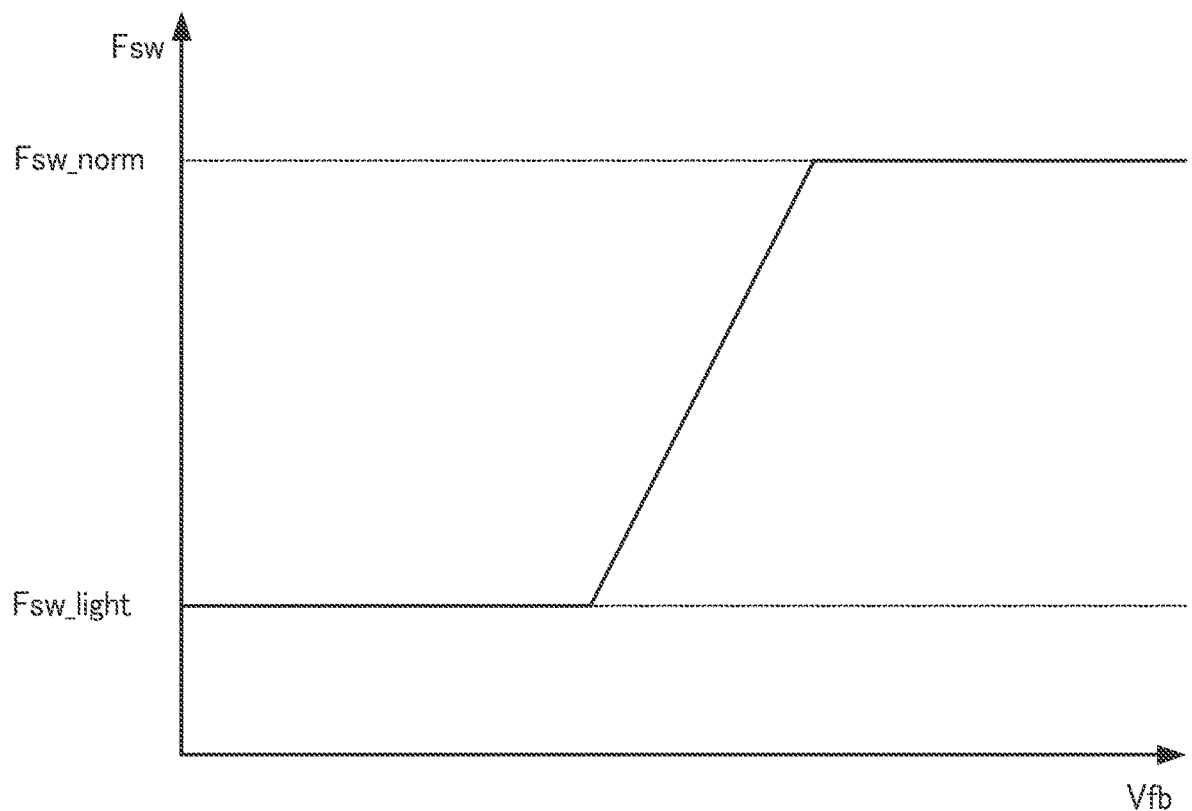
FIG. 4 is a chart illustrating a relationship between a feedback voltage Vfb and a frequency Fsw of an oscillator signal osc_out.

The oscillator circuit 60 generates timing at which the power transistor 30 is turned on. Specifically, the oscillator circuit 60 outputs an oscillator signal osc_out, based on the feedback voltage Vfb. Further, a frequency Fsw of the oscillator signal osc_out is usually set to a predetermined frequency Fsw_norm (e.g., 100 kHz) as illustrated in FIG. 4, for example, and is set so as to decrease with a drop in the feedback voltage Vfb.

===Comparator 61===

The comparator 61 of FIG. 2 generates timing at which the power transistor 30 is turned off. Specifically, the comparator 61 outputs a high signal Vr to turn off the power transistor 30, in response to the voltage Vcs reaching the feedback voltage Vfb when the power transistor 30 is on.

===SR Flip-Flop 62===

In response to the oscillator circuit 60 outputting the high oscillator signal osc_out to turn on the power transistor 30, the SR flip-flop 62 outputs the high signal Vq1 to turn on the power transistor 30.

Meanwhile, in response to the comparator 61 outputting the high signal Vr, the SR flip-flop 62 outputs the low signal Vq1 to turn off the power transistor 30. As such, the switching period of the driving signal Vq1 changes with the frequency Fsw which changes with the feedback voltage Vfb.

==Driver Circuit 56==

The driver circuit 56 outputs the drive voltage Vg through the terminal OUT, in response to the driving signal Vq1, to thereby drive the power transistor 30.

Specifically, upon receiving the high driving signal Vq1, the driver circuit 56 outputs the drive voltage Vg that is the power supply voltage Vcc, to thereby turn on the power transistor 30. Meanwhile, upon receiving the low driving signal Vq1, the driver circuit 56 outputs the drive voltage Vg that is the ground voltage, to thereby turn off the power transistor 30.

Note that when receiving a signal to stop switching the power transistor 30 from a protection circuit (not illustrated) that protects the AC-DC converter 10, the driver circuit 56 maintains the drive voltage Vg at the ground voltage, to stop switching the power transistor 30.

==Overview of Control Circuit 57==

The control circuit 57 determines whether the power supply voltage Vcc drops below a threshold level Vvccl (described later), to output a signal Son to operate the current output circuit 39a. Specifically, when the power supply voltage Vcc is lower than the threshold level Vvccl according to a reference voltage Vref_vcc, the control circuit 57 outputs, to the current output circuit 39a, the high signal Son to charge the capacitor 33 such that the power supply voltage Vcc will be maintained at a high level. Note that the threshold levels Vvcch and Vvccl will be described below with reference to FIG. 5.

Meanwhile, when the power supply voltage Vcc is higher than the threshold level Vvcch according to the reference voltage Vref_vcc, the control circuit 57 outputs, to the current output circuit 39a, the low signal Son to stop charging the capacitor 33.

==Details of Control Circuit 57==

Figure 5:
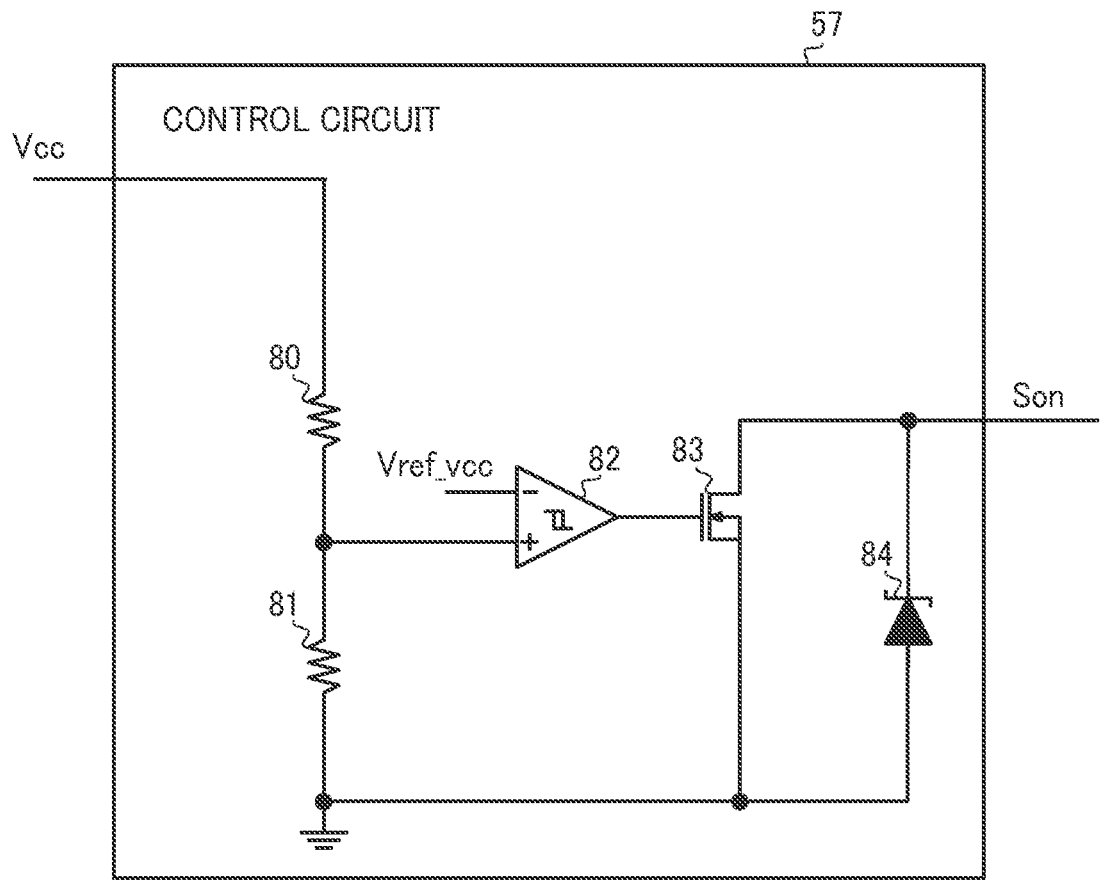
FIG. 5 is a diagram illustrating a configuration example of a control circuit 57.

As illustrated in FIG. 5, the control circuit 57 includes resistors 80 and 81, a hysteresis comparator 82, an NMOS transistor 83, and a zener diode 84. The resistors 80 and 81 are provided in series between the node that receives the power supply voltage Vcc and the ground, and configure a voltage divider circuit. The resistor 80 has one end to receive the power supply voltage Vcc, and the other end coupled with one end of the resistor 81. The other end of the resistor 81 is grounded.

The voltage at the coupling point of the resistors 80 and 81 is applied to the non-inverting input terminal of the hysteresis comparator 82. Further, the reference voltage Vref_vcc is applied to the inverting input terminal of the hysteresis comparator 82.

Then, the hysteresis comparator 82 generates the high threshold level Vvcch and the threshold level Vvccl lower than the threshold level Vvcch, based on the reference voltage Vref_vcc. Note that the threshold level Vvccl is higher than the predetermined level Voff.

In response to the voltage at the coupling point of the resistors 80 and 81 dropping below the threshold level Vvccl, the hysteresis comparator 82 outputs a low signal. Meanwhile, in response to the voltage at the coupling point of the resistors 80 and 81 exceeding the threshold level Vvcch, the hysteresis comparator 82 outputs a high signal.

The NMOS transistor 83 has a gate electrode to receive the signal from the hysteresis comparator 82, a source electrode grounded, and a drain electrode to output the signal Son therefrom.

In response to the hysteresis comparator 82 outputting the high signal, the NMOS transistor 83 is turned on. In this case, the control circuit 57 outputs the low signal Son.

Meanwhile, in response to the hysteresis comparator 82 outputting the low signal, the NMOS transistor 83 is turned off. In this case, the drain electrode of the NMOS transistor 83 is pulled up by a resistor 121 (described later) in the current output circuit 39a, and thus the signal Son results in being high.

The zener diode 84 is an element to determine the voltage level of the signal Son when the high signal Son is outputted, and the current output circuit 39a of FIG. 1 determines the voltage when charging the capacitor 33 of FIG. 1.

In other words, the zener diode 84 is an element to determine the upper voltage limit of the power supply voltage Vcc that is generated at the capacitor 33, when the current output circuit 39a charges the capacitor 33.

Further, the zener diode 84 functions as a protective element such that the drain-source voltage of the NMOS transistor 83 does not exceed the withstand voltage of the NMOS transistor 83.

The zener diode 84 is coupled in parallel with the NMOS transistor 83, and has an anode grounded and a cathode coupled to the drain electrode of the NMOS transistor 83.

Further, when the NMOS transistor 83 is turned off, the zener diode 84 passes the current from the resistor 121 to the ground, and maintains the voltage at the drain electrode of the NMOS transistor 83 such that an NMOS transistor 120 (described later) can be turned on.

From the above, the control circuit 57 control charging of the capacitor 33 performed by the current output circuit 39a, based on the power supply voltage Vcc, resulting in restraining the power supply voltage Vcc from dropping below the threshold level Vvccl. Note that the threshold level Vvccl is higher than the threshold level Vdssh and the predetermined level Voff.

Note that the NMOS transistor 83 corresponds to a "first switch" and a "first NMOS transistor", the threshold level Vvccl corresponds to a "first voltage", and the control circuit 57 corresponds to a "determination circuit".

<<Generation of Driving Signal Vq1, and Change in Power Supply Voltage Vcc in Association with Driving Signal Vq1>>

Figure 6A:
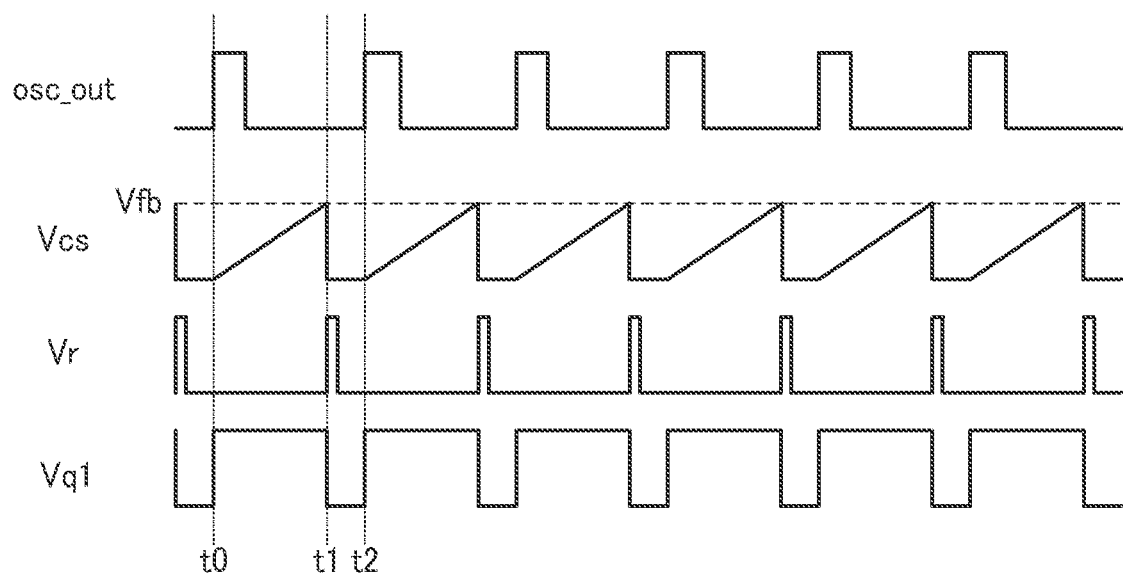
FIG. 6A is a chart explaining an operation of generating a driving signal Vq1 in a case of a heavy load.
Figure 6B:
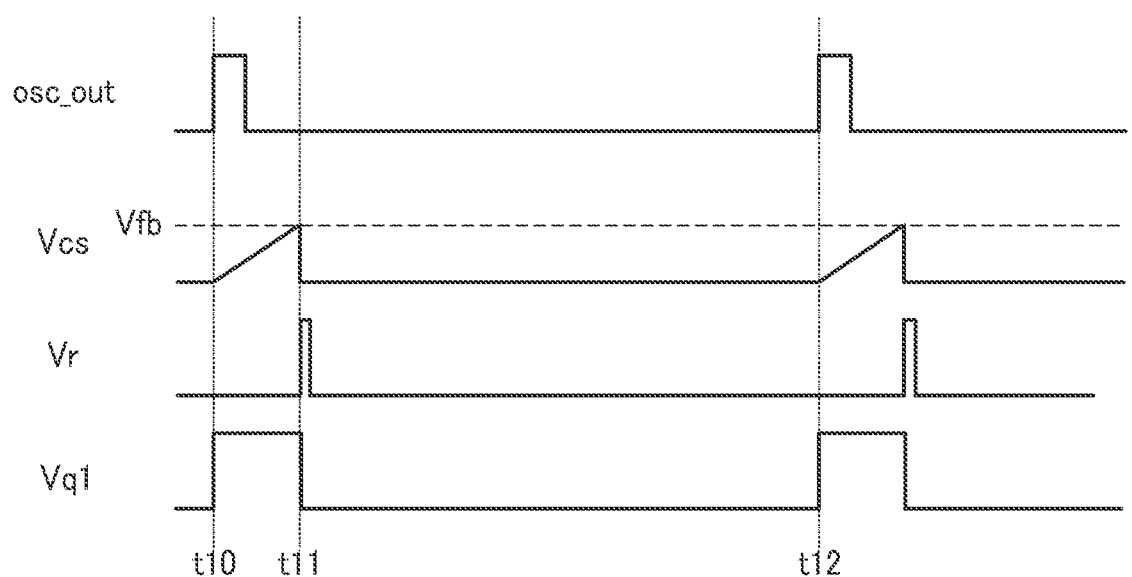
FIG. 6B is a chart explaining an operation of generating a driving signal Vq1 in a case of a light load (or in a case of lowering an output voltage Vout).

FIGS. 6A and 6B are charts explaining operations of generating the driving signal Vq1 by the driving signal output circuit 55. First, with reference to FIG. 6A, a description will be given of the operation of generating the driving signal Vq1 by the driving signal output circuit 55.

In this case, the feedback voltage Vfb is high because the DC-DC converter 11 of FIG. 1 is under a heavy load condition, for example, which will be described later in detail. Thus, the frequency Fsw of the oscillator signal osc_out is the predetermined frequency Fsw_norm given in FIG. 4.

Note that the phrase "the DC-DC converter 11 is under the heavy load condition" indicates, for example, that the current value of the load current Iout flowing through the DC-DC converter 11 is larger than a predetermined value (e.g., 1 A). Meanwhile, the phrase "the DC-DC converter 11 is under a light load condition" indicates, for example, that the current value of the load current Iout flowing through the DC-DC converter 11 is smaller than the predetermined value (e.g., 1 A).

In addition, the phrase "the DC-DC converter 11 is under no load condition" indicates that the current value of the load current Iout flowing through the DC-DC converter 11 is extremely small or 0 (zero) A. Further, although a description has been given such that the current value of the load current Iout to determine whether the DC-DC converter 11 is under the heavy load condition or the light load condition is 1 A, for example, this current value can be variously set.

Note that the driving signal output circuit 55 generates the driving signal Vq1 to control the rate of the on time period of the power transistor 30 with respect to the switching period determined by the frequency Fsw of the oscillator signal osc_out (i.e., perform PWM control).

In the case of FIG. 6A, in response to the DC-DC converter 11 becoming under the heavy load condition, in other words, in response to an increase in the load current Iout and a drop in the output voltage Vout, the difference between the output voltage Vout and the voltage Vshunt from the voltage regulator circuit 42 decreases. Accordingly, the intensity of the light from the light-emitting diode 43 decreases, the sink current Ia of FIG. 1 decreases, and the feedback voltage Vfb rises.

Further, when the voltage regulator circuit 42 shifts the voltage Vshunt from the low voltage Vshunt to the high voltage Vshunt to output the high voltage Vshunt in response to the signal Sig from the MCU 12, the difference between the output voltage Vout and the voltage Vshunt from the voltage regulator circuit 42 decreases. Accordingly, the intensity of the light from the light-emitting diode 43 decreases, the sink current Ia decreases, and the feedback voltage Vfb rises, similarly.

In response to the oscillator circuit 60 of FIG. 2 outputting the high oscillator signal osc_out at time t0, the SR flip-flop 62 outputs the high driving signal Vq1 to turn on the power transistor 30. The voltage Vcs linearly rises according to this on of the power transistor 30.

At time t1 at which the voltage Vcs reaching the feedback voltage Vfb with the power transistor 30 being on, the comparator 61 outputs the high signal Vr. This causes the SR flip-flop 62 to output the low driving signal Vq1 to turn off the power transistor 30. According to this turning off of the power transistor 30, the voltage Vcs reaches the ground voltage.

At time t2 at which a time period corresponding to the switching period according to the predetermined frequency Fsw_norm has elapsed since time t0, the oscillator circuit 60 outputs the high oscillator signal osc_out again. The same or similar operation will continue thereafter.

In this case, the inductor current IL1 flowing through the primary coil L1 increases and the inductor current IL2 generated in the secondary coil L2 increases. Then, the output voltage Vout rises with an increase in the inductor current IL2.

The secondary coil L2 is magnetically coupled with the auxiliary coil L3, and thus the voltage Va across the auxiliary coil L3 rises with a rise in the output voltage Vout. Accordingly, in this case, the power supply voltage Vcc is maintained at a high level without operating the current output circuit 39a.

Next, with reference to FIG. 6B, a description will be given of the operation of generating the driving signal Vq1 by the driving signal output circuit 55. In this case, for example, the DC-DC converter 11 of FIG. 1 is under the light load condition, which will be described later in detail, and thus the feedback voltage Vfb drops. Thus, the frequency Fsw of the oscillator signal osc_out is the predetermined frequency Fsw_light lower than the predetermined frequency Fsw_norm illustrated in FIG. 4.

In the case of FIG. 6B, in response to the DC-DC converter 11 becoming under the light load condition, in other words, in response to a decrease in the load current Iout and a rise in the output voltage Vout, the difference between the output voltage Vout and the voltage Vshunt from the voltage regulator circuit 42 increases. Accordingly, the intensity of the light from the light-emitting diode 43 increases, the sink current Ia of FIG. 1 increases, and the feedback voltage Vfb drops.

Further, when the voltage regulator circuit 42 shifts the voltage Vshunt from the high voltage Vshunt to the low voltage Vshunt to output the low voltage Vshunt, in response to the signal Sig from the MCU 12, the difference between the output voltage Vout and the voltage Vshunt from the voltage regulator circuit 42 increases. Accordingly, the intensity of the light from the light-emitting diode 43 increases, the sink current Ia increases, and the feedback voltage Vfb drops, similarly.

In FIG. 6B where the feedback voltage Vfb is low, the driving signal output circuit 55 generates the driving signal Vq1, similarly to the case of FIG. 6A. However, since the frequency Fsw of the oscillator signal osc_out is low, the switching period according to the predetermined frequency Fsw_light between time t10 and time t12 is longer than that in the case of FIG. 6A. In other words, when the DC-DC converter 11 is under the light load condition and the load current Iout decreases, the switching period increases.

Further, the feedback voltage Vfb is lowered, and thus a time period during which the power transistor 30 is on decreases as compared with the case of FIG. 6A.

In this case, the inductor current IL1 flowing through the primary coil L1 decreases and the inductor current IL2 generated across the secondary coil L2 decreases. Then, the output voltage Vout drops with a decrease in the inductor current IL2.

As described above, the secondary coil L2 is magnetically coupled with the auxiliary coil L3, and thus the voltage Va across the auxiliary coil L3 drops with a drop in the output voltage Vout. Accordingly, in this case, the power supply voltage Vcc is not maintained at a high level unless the current output circuit 39a operates.

Meanwhile, also when switching of the power transistor 30 is stopped, the voltage Va across the auxiliary coil L3 drops. Accordingly, the power supply voltage Vcc is not maintained at a high level unless the current output circuit 39a operates. In this case, similarly to the case where the DC-DC converter 11 is under the heavy load condition, the output voltage Vout also drops.

Thus, in response to switching of the power transistor 30 being started, the AC-DC converter 10 raises the output voltage Vout. As a result, in response to switching of the power transistor 30 being started, the voltage Va across the auxiliary coil L3 rises, and also the power supply voltage Vcc is maintained at a high level.

<<Configuration of Current Output Circuit 39a>>==Current Output Circuit 39a==

Figure 7:
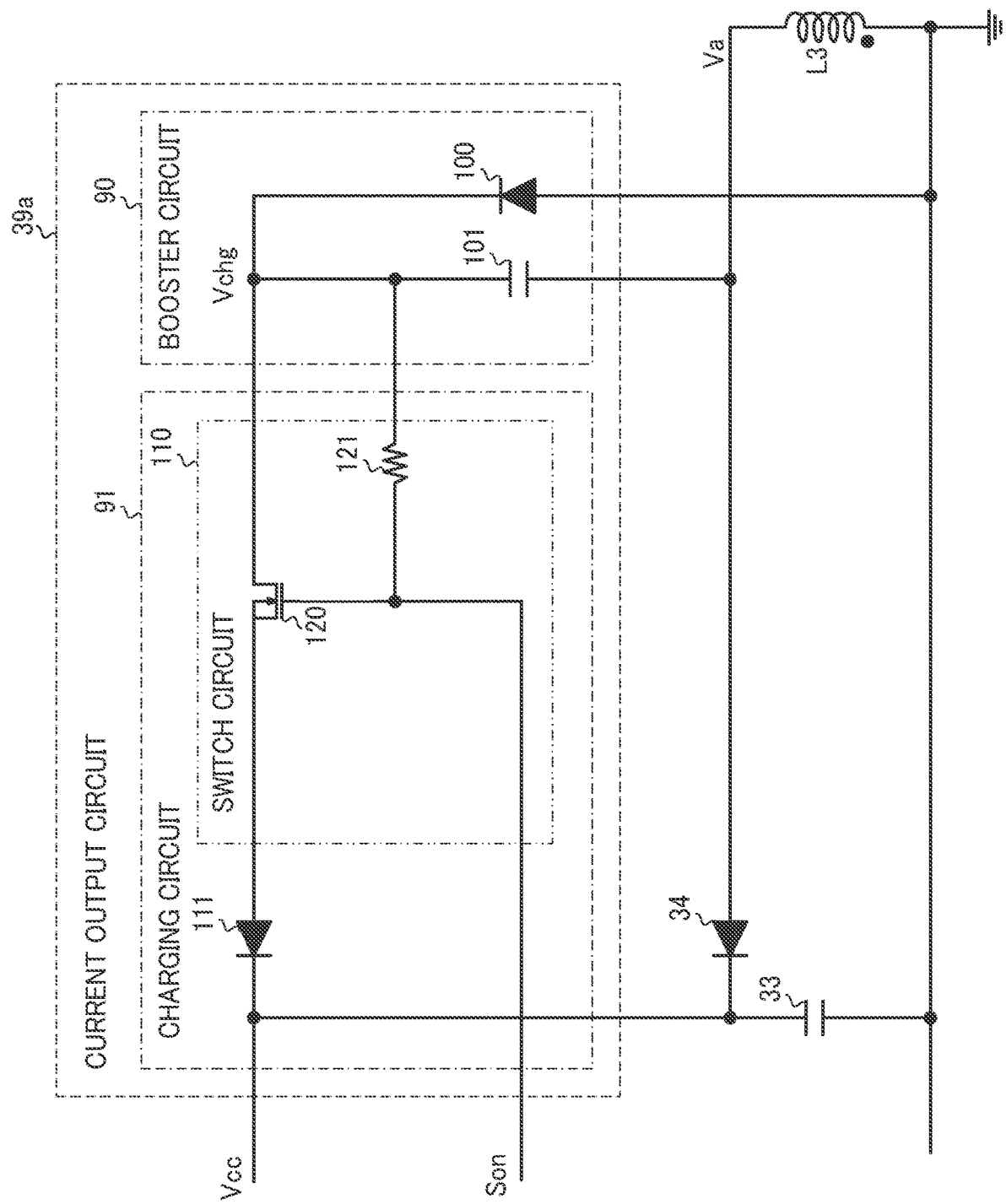

FIG. 7 is a diagram illustrating a configuration example of the current output circuit 39a. The current output circuit 39a charges the capacitor 33 of FIG. 1 in response to a drop in the power supply voltage Vcc. Although the details will be described later, the current output circuit 39a charges the capacitor 33, when the voltage corresponding to the power supply voltage Vcc is lower than the threshold level Vvccl.

Meanwhile, when the voltage corresponding to the voltage Vcc is higher than the threshold level Vvcch, the current output circuit 39a does not charge the capacitor 33. Further, the current output circuit 39a includes a booster circuit 90 and a charging circuit 91, as illustrated in FIG. 7.

===Boost Circuit 90===

The booster circuit 90 generates a boost voltage Vchg based on the voltage Va across the auxiliary coil L3. Specifically, the booster circuit 90 generates the boost voltage Vchg obtained by adding the voltage Va to the voltage charged in a capacitor 101.

The booster circuit 90 includes a diode 100 and the capacitor 101. The diode 100 has an anode coupled to the one end of the auxiliary coil L3 that is grounded, and a cathode coupled to one end of the capacitor 101. The other end of capacitor 101 is coupled to the other end of the auxiliary coil L3, to receive the voltage Va.

Accordingly, in response to the voltage Va reaching a negative voltage, the capacitor 101 is charged with a current through the diode 100. Meanwhile, in response to the voltage Va reaching a positive voltage, the boost voltage Vchg is generated across the capacitor 101. Note that the diode 100 corresponds to a "second diode" and the capacitor 101 corresponds to a "second capacitor".

===Charging Circuit 91===

The charging circuit 91 charges the capacitor 33 of FIG. 1 based on the boost voltage Vchg from the booster circuit 90, when the power supply voltage Vcc is lower than the threshold level Vvccl. Specifically, in response to the control circuit 57 outputting the high signal Son, the charging circuit 91 charges the capacitor 33 based on the boost voltage Vchg. Meanwhile, when the control circuit 57 outputs the low signal Son, the charging circuit 91 does not charge the capacitor 33.

====Switch Circuit 110 and the Diode 111

The charging circuit 91 includes a switch circuit 110 and a diode 111. The switch circuit 110 electrically couples between the one end of the capacitor 101 and the diode 111, in response to the signal Son. The switch circuit 110 includes the NMOS transistor 120 and the resistor 121.

The NMOS transistor 120 is provided between the one end of the capacitor 101 and the anode of the diode 111. Specifically, the NMOS transistor 120 has a drain electrode coupled to the one end of the capacitor 101, and a source electrode coupled to the anode of the diode 111. Further, the resistor 121 is provided between the drain electrode and the gate electrode of the NMOS transistor 120.

Further, the signal Son is inputted to the gate electrode of the NMOS transistor 120. Note that the resistor 121 functions as a current limiting resistor to generate a potential of the gate electrode of the NMOS transistor 120 when it is turned on.

With the above configuration, when the power supply voltage Vcc is lower than the threshold level Vvccl and the control circuit 57 outputs the high signal Son, the switch circuit 110 applies, to the anode of the diode 111, the voltage obtained by subtracting the threshold voltage Vth of the NMOS transistor 120 from the voltage of the high signal Son (hereinafter, referred to as "voltage (Son-Vth)").

Meanwhile, when the power supply voltage Vcc is higher than the threshold level Vvcch and the control circuit 57 outputs the low signal Son, the switch circuit 110 does not apply the voltage (Son-Vth) to the anode of the diode 111.

Then, when the voltage (Son-Vth) is applied to the anode, the diode 111 supplies a current for charging the capacitor 33 based on the boost voltage Vchg, since the cathode thereof is coupled to the capacitor 33. Meanwhile, when the voltage (Son-Vth) is not applied to the anode, the diode 111 does not supply the current for discharging the capacitor 33.

Note that when the power supply voltage Vcc is higher than the voltage (Son-Vth) as well, the diode 111 prevent the current based on the power supply voltage Vcc from flowing toward the booster circuit 90.

From the above, in response to the power supply voltage Vcc dropping below the threshold level Vvccl, the current output circuit 39*a* charges the capacitor 33 with the boost voltage Vchg. Meanwhile, when the power supply voltage Vcc exceeds the threshold level Vvcch, the current output circuit 39*a* does not charge the capacitor 33.

Accordingly, the control IC 32 maintains the power supply voltage Vcc at a high level such that the startup circuit 53 does not charge the capacitor 33 as well as the under voltage protection circuit 50 does not reset the control IC 32. Note that the diode 111 corresponds to a "third diode", the NMOS transistor 120 corresponds to a "second switch", a "second NMOS transistor", and "another NMOS transistor", and the charging circuit 91 corresponds to a "first charging circuit".

<<Generation of Power Supply Voltage Vcc According to Feedback Voltage Vfb>>

Figure 8:
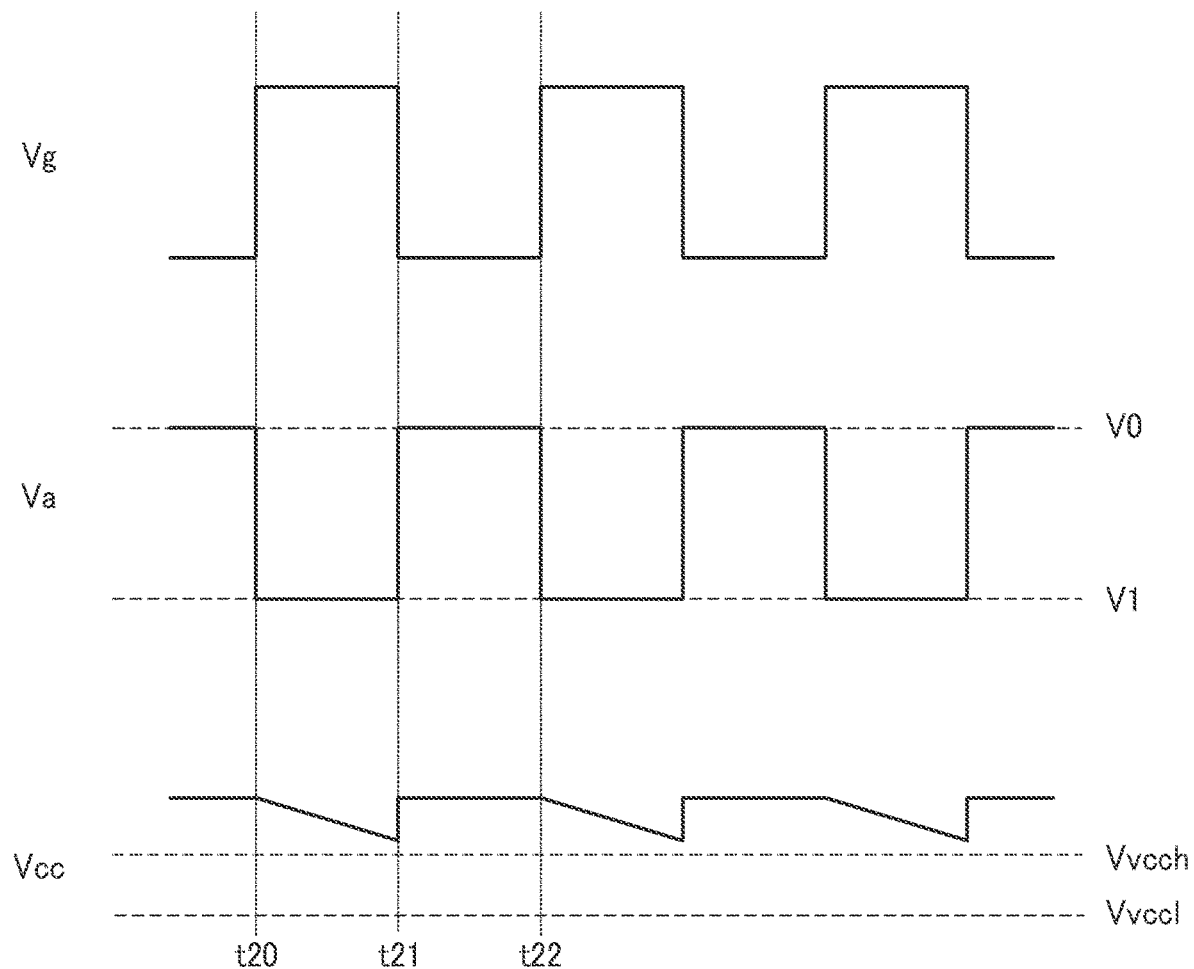
FIG. 8 is a chart illustrating how a power supply voltage Vcc is generated when a feedback voltage Vfb is high.

First, with reference to FIG. 8, a description will be given of generation of the power supply voltage Vcc when the DC-DC converter 11 is under the heavy load condition and the feedback voltage Vfb is high. Note that, in this case, without using the current output circuit 39*a*, in other words, even if the switch circuit 110 is off, the control IC 32 can maintain the power supply voltage Vcc at a level higher than the threshold level Vvccl.

In the following, for simplicity of explanation, it is assumed that the forward voltages of the diodes 100 and 111 of FIG. 7 will not be considered unless necessary, and that the startup of the AC-DC converter 10 has been completed. It is further assumed that the power supply voltage Vcc is higher than the threshold level Vvccl.

At time t20, in response to the control IC 32 outputting the drive voltage Vg that is the power supply voltage Vcc, the power transistor 30 is turned on. In response to turning on of the power transistor 30, the inductor current IL1 flows through the primary coil L1.

The windings of the primary coil L1 and the auxiliary coil L3 are formed such that the voltages generated across the primary coil L1 and the auxiliary coil L3 are opposite in polarity. Thus, in this case, the voltage Va across the auxiliary coil L3 reaches a negative voltage V1. In response to the voltage Va reaching the negative voltage V1, the capacitor 101 is charged through the diode 100.

The boost voltage Vchg at this point is substantially the ground voltage. Further, since the voltage Va across the auxiliary coil L3 is the negative voltage V1, the capacitor 33 is not charged through the diode 34. Thus, the power supply voltage Vcc gradually drops due to the power consumption of the control IC 32.

At time t21 at which the control IC 32 outputs the drive voltage Vg that is the ground voltage, the power transistor 30 is turned off. When the power transistor 30 is turned off, the inductor current IL1 does not flow through the primary coil L1. In this case, the voltage Va across the auxiliary coil L3 reaches a positive voltage V0.

In response to the voltage Va reaching the positive voltage V0, the boost voltage Vchg resulting in the positive voltage V0− the negative voltage V1, and the capacitor 33 is charged through the diode 34. Further, since the power supply voltage Vcc is higher than the threshold level Vvccl, the switch circuit 110 is turned off. Accordingly, the charging circuit 91 does not charge the capacitor 33 with the boost voltage Vchg.

From time t22, the same or similar operation will be repeated. In the foregoing case, the time period during which the power transistor 30 is on is long, and the inductor current IL1 flowing through the primary coil L1 is large. In addition, the switching period of the power transistor 30 is short.

Thus, the power supply voltage Vcc can be maintained at a level sufficiently higher than the threshold level Vvccl, only with the charging of the capacitor 33 with the voltage Va. In this case, the startup circuit 53 does not charge the capacitor 33 through the terminal VCC, and thus there is no power loss caused by the startup element 51.

Figure 9:
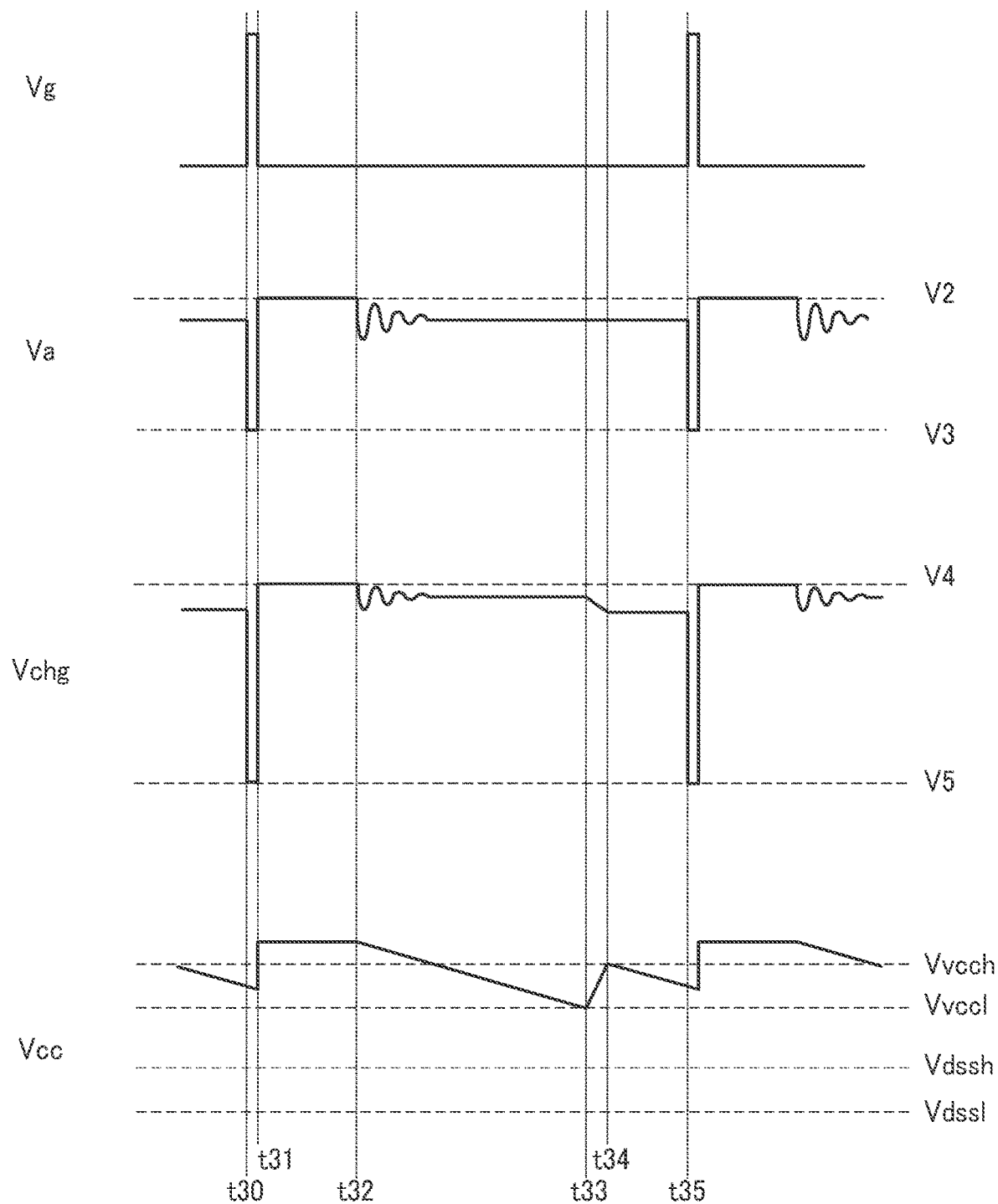
FIG. 9 is a chart illustrating how a power supply voltage Vcc is generated when a feedback voltage Vfb is low.

Next, with reference to FIG. 9, a description will be given of generation of the power supply voltage Vcc when the DC-DC converter 11 is under the light load condition and the feedback voltage Vfb is low. Note that, in this case, with the use of the current output circuit 39*a*, in other words, with the switch circuit 110 being turned on, the control IC 32 can maintain the power supply voltage Vcc at a level higher than the threshold level Vdssl.

In the following, for simplicity of explanation, it is assumed that the forward voltages of the diodes 100 and 111 of FIG. 7 will not be considered unless necessary, and that the startup of the AC-DC converter 10 has been completed.

At time t30, in response to the control IC 32 outputting the drive voltage Vg that is the power supply voltage Vcc, the power transistor 30 is turned on. In response to turning on of the power transistor 30, the inductor current IL1 flows through the primary coil L1.

In this case, the voltage Va across the auxiliary coil L3 reaches a negative voltage V3. In response to the voltage Va reaching the negative voltage V3, the capacitor 101 is charged through the diode 100.

The boost voltage Vchg at this point is a voltage V5 (specifically, the ground voltage− the forward voltage Vdth of the diode 100). Further, since the voltage Va across the auxiliary coil L3 is the negative voltage V3, the capacitor 33 is not charged through the diode 34. Thus, the power supply voltage Vcc gradually drops due to the power consumption of the control IC 32.

At time t31 at which the control IC 32 outputs the drive voltage Vg that is the ground voltage, the power transistor 30 is turned off. When the power transistor 30 is turned off, the inductor current IL1 does not flow through the primary coil L1. In this case, the voltage Va across the auxiliary coil L3 reaches a positive voltage V2.

In response to the voltage Va reaching the positive voltage V2, the boost voltage Vchg resulting in the voltage obtained by adding the voltage Va to the voltage generated in the capacitor 101 (specifically, the positive voltage V2− the negative voltage V3). Further, the capacitor 33 is charged through the diode 34.

At time t32, the voltage Va start fluctuating, although being a positive voltage, due to the resonant operation between the primary coil L1 and the parasitic capacitance of the power transistor 30. When such a fluctuation is started, the voltage Va drops. Then, the boost voltage Vchg fluctuates similarly in accordance with the fluctuation of the voltage Va. In response to the fluctuation of the voltage Va being ended, the current based on the voltage Va from the auxiliary coil L3 is stopped. Then, the power supply voltage Vcc gradually drops due to the power consumption of the control IC 32.

In response to the control circuit 57 outputting the high signal Son at time t33, at which the power supply voltage Vcc drops below the threshold level Vvccl, the NMOS transistor 120 is turned on and the capacitor 33 is charged with the boost voltage Vchg. Thus, the power supply voltage Vcc rises and the boost voltage Vchg drops.

In response to the control circuit 57 outputting the low signal Son at time t34, at which the power supply voltage Vcc exceeds the threshold level Vvcch, the NMOS transistor 120 is turned off, and the capacitor 33 is not charged with the boost voltage Vchg. Thus, the power supply voltage Vcc gradually drops due to the power consumption of the control IC 32, and the boost voltage Vchg becomes constant.

From time t35, the same or similar operation will be repeated. In the foregoing case, the time period during which the power transistor 30 is on is short, and the inductor current IL1 flowing through the primary coil L1 is small. In addition, the switching period of the power transistor 30 is long.

Thus, the voltage Va across the auxiliary coil L3 drops, the power supply voltage Vcc may not be able to be maintained at a level sufficiently higher than the threshold level Vvccl, only with the charging of the capacitor 33 with the voltage Va.

However, the capacitor 33 is charged with the boost voltage Vchg, and thus when the operation from time t30 to time t35 is repeated, the power supply voltage Vcc is restrained from dropping.

In this case, by virtue of the operation of the charging circuit 91, the startup circuit 53 does not charge the capacitor 33 through the terminal VCC with the startup element 51 operating in response to the power supply voltage Vcc being lower than the threshold level Vdssl. This suppresses power loss caused by the startup element 51.

Figure 10:
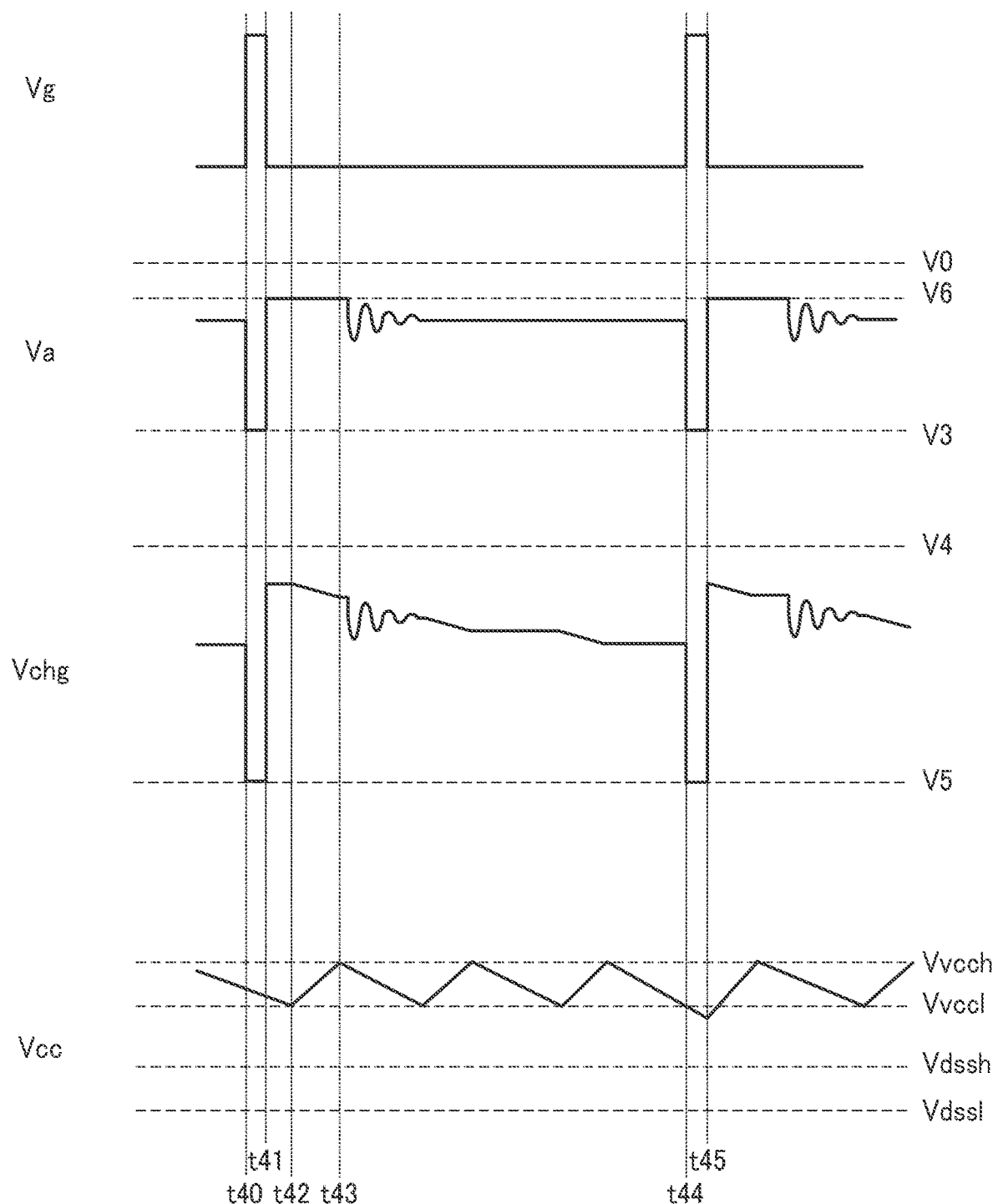
FIG. 10 is a chart illustrating how a power supply voltage Vcc is generated in a case of lowering an output voltage Vout.

Finally, with reference to FIG. 10, a description will be given of generation of the power supply voltage Vcc when the AC-DC converter 10 lowers the output voltage Vout. Note that, in this case, the feedback voltage Vfb drops similarly to the case where the DC-DC converter 11 is under the light load condition. Further, with the use of the current output circuit 39a, in other words, with the switch circuit 110 being turned on, the control IC 32 can maintain the power supply voltage Vcc at a level higher than the threshold level Vdssl.

In the following, for simplicity of explanation, it is assumed that the forward voltages of the diodes 100 and 111 of FIG. 7 will not be considered unless necessary, and that the startup of the AC-DC converter 10 has been completed.

At time t40, in response to the control IC 32 outputting the drive voltage Vg that is the power supply voltage Vcc, the power transistor 30 is turned on. In response to turning on of the power transistor 30, the inductor current IL1 flows through the primary coil L1.

In this case, the voltage Va across the auxiliary coil L3 reaches the negative voltage V3. In response to the voltage Va reaching the negative voltage V3, the capacitor 101 is charged through the diode 100.

The boost voltage Vchg at this point is the voltage V5 (specifically, the ground voltage– the forward voltage Vdth of the diode 100). Further, since the voltage Va across the auxiliary coil L3 is the negative voltage V3, the capacitor 33 is not charged through the diode 34. Thus, the power supply voltage Vcc gradually drops due to the power consumption of the control IC 32.

At time t41 at which the control IC 32 outputs the drive voltage Vg that is the ground voltage, the power transistor 30 is turned off. When the power transistor 30 is turned off, the inductor current IL1 does not flow through the primary coil L1. In this case, the voltage Va across the auxiliary coil L3 reaches a positive voltage V6.

Note that, since the output voltage Vout drops, the positive voltage V6 is lower than the positive voltage V0 at the time when the output voltage Vout is high, according to the output voltage Vout. In this case, it becomes impossible to raise the power supply voltage to become higher than the threshold level Vvccl by charging the capacitor 33 through the diode 34.

Further, in response to the voltage Va reaching the positive voltage V6, the boost voltage Vchg results in the voltage obtained by adding the voltage Va to the voltage generated across the capacitor 101 (specifically, the positive voltage V6– the negative voltage V3).

In response to the control circuit 57 outputting the high signal Son at time t42, at which the power supply voltage Vcc reaches the threshold level Vvccl, the NMOS transistor 120 is turned on and the capacitor 33 is charged with the boost voltage Vchg. Thus, the power supply voltage Vcc rises and the boost voltage Vchg drops.

In response to the control circuit 57 outputting the low signal Son at time t43, at which the power supply voltage Vcc reaches the threshold level Vvcch, the NMOS transistor 120 is turned off and the capacitor 33 is not charged with the boost voltage Vchg. Thus, the power supply voltage Vcc gradually drops due to the power consumption of the control IC 32, and the boost voltage Vchg becomes constant.

Thereafter, the voltage Va starts fluctuating, although being a positive voltage, due to the resonant operation between the primary coil L1 and the parasitic capacitance of the power transistor 30. When such a fluctuation is started, the voltage Va drops. Then, the boost voltage Vchg fluctuates similarly in accordance with the fluctuation of the voltage Va. In response to the fluctuation of the voltage Va being ended, the current based on the voltage Va from the auxiliary coil L3 is stopped. Then, the power supply voltage Vcc gradually drops due to the power consumption of the control IC 32.

From this point until time t44, the operations at time t42 and t43 are repeated. Then, at time t44 at which the power transistor 30 is turned on, the boost voltage Vchg reaches the negative voltage V5, and thus even if the NMOS transistor 120 is turned on, the current output circuit 39a cannot charge the capacitor 33, resulting in the power supply voltage Vcc temporarily becoming lower than the threshold level Vvccl.

At time t45 at which the power transistor 30 is turned off, the boost voltage Vchg exceeds the voltage capable of charging the capacitor 33, and thus the current output circuit 39a charges the capacitor 33 until the power supply voltage Vcc reaches the threshold level Vvcch. From time t45, the operation from time t41 to time t45 is repeated.

Modification Examples

Figure 11:
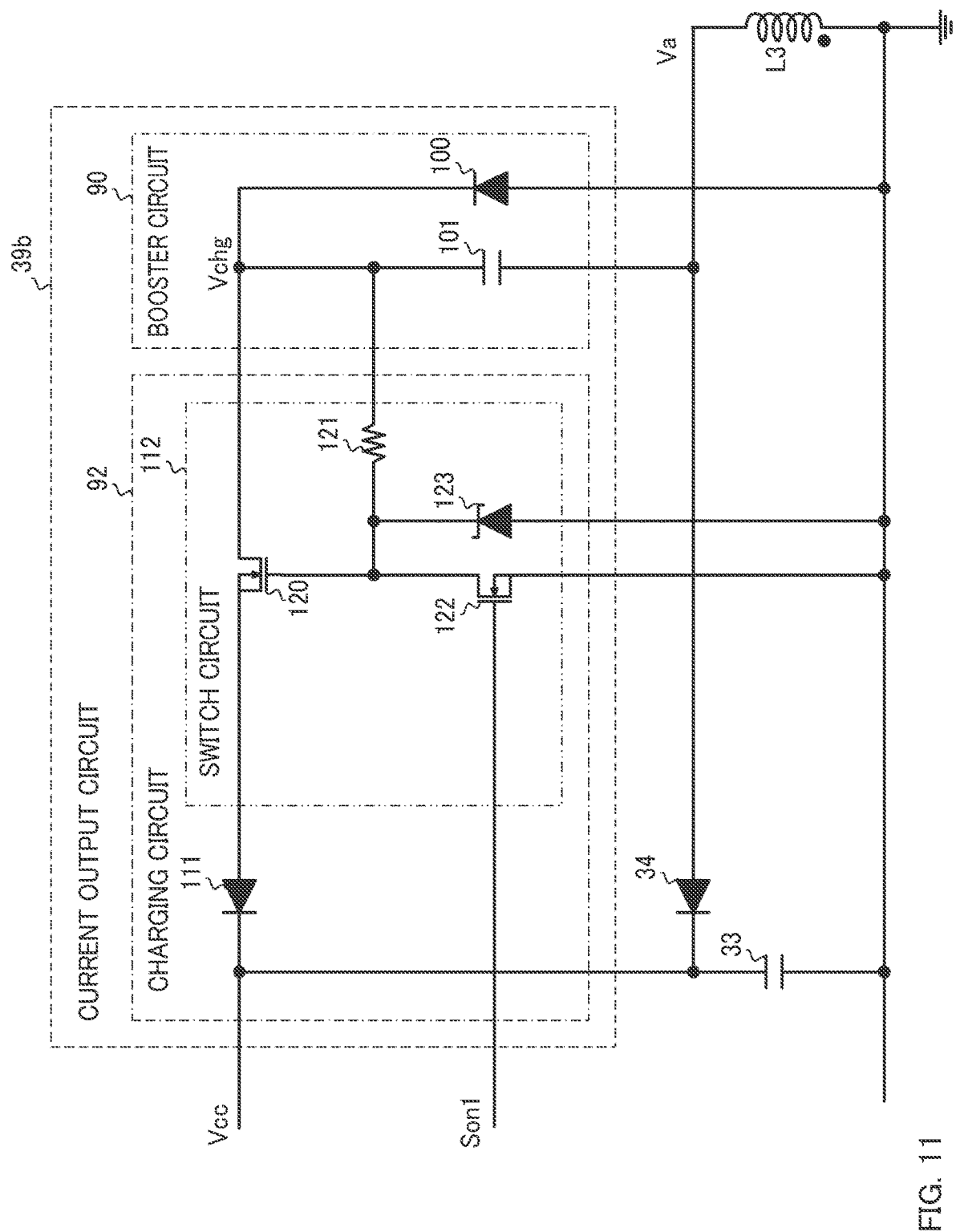
FIG. 11 is a diagram illustrating a configuration example of a current output circuit 39b.

In embodiments described above, the control circuit 57 includes the NMOS transistor 83 and the zener diode 84. However, as illustrated in FIG. 11, the NMOS transistor 83 and the zener diode 84 may be moved to a current output circuit 39b, and given an NMOS transistor 122 and a zener diode 123, respectively.

Specifically, the current output circuit 39b charges the capacitor 33 when the power supply voltage Vcc is low, in response to the signal Son 1 from the control IC 32. The current output circuit 39b includes the booster circuit 90 and a charging circuit 92. Note that, in modification examples, parts or elements in FIGS. 11, 12, and 13 that are the same as those in the foregoing embodiments are given the same reference numerals.

The charging circuit 92 charges the capacitor 33 based on the boost voltage Vchg from the booster circuit 90 when the power supply voltage Vcc is low, similarly to the charging circuit 91. The charging circuit 92 includes the diode 111 and a switch circuit 112.

The switch circuit 112 electrically couples between the one end of the capacitor 101 and the diode 111, similarly to the switch circuit 110. The switch circuit 112 includes the NMOS transistors 120 and 122, the resistor 121, and the zener diode 123. Note that the functions of the NMOS transistor 122 and the zener diode 123 are the same as those of the NMOS transistor 83 and the zener diode 84, respectively.

Figure 12:
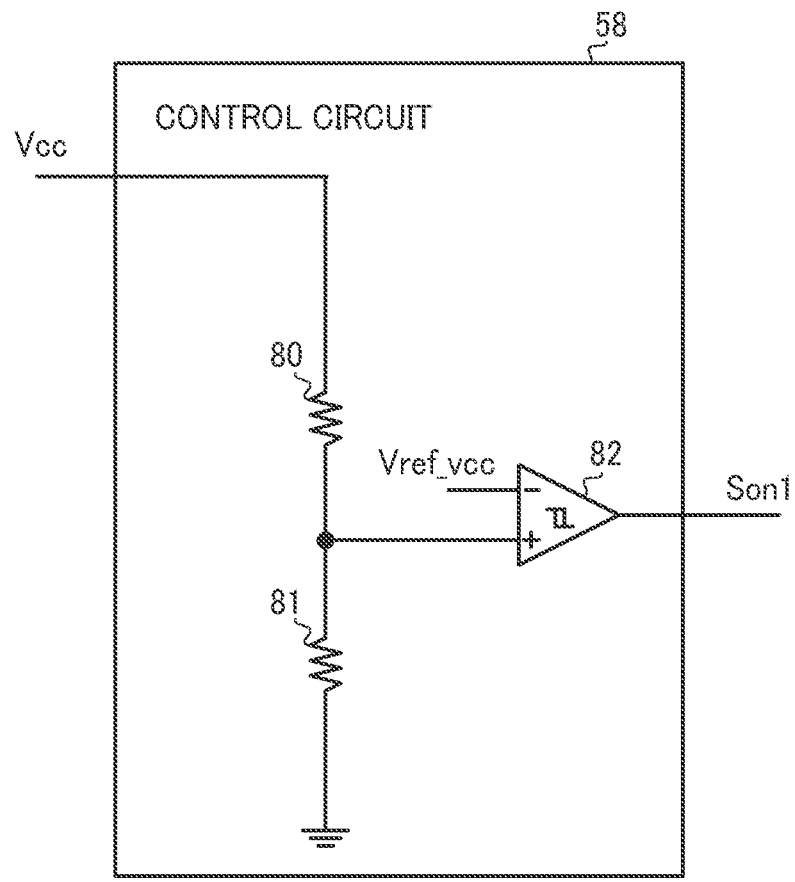
FIG. 12 is a diagram illustrating a configuration example of a control circuit 58.

In this case, the control circuit 57 is modified as given in a control circuit 58 of FIG. 12. Note that the NMOS transistor 122 corresponds to the "first switch" and a "third NMOS transistor", the zener diode 123 corresponds to a "first zener diode", and the signal Son1 corresponds to a "determination result".

Figure 13:
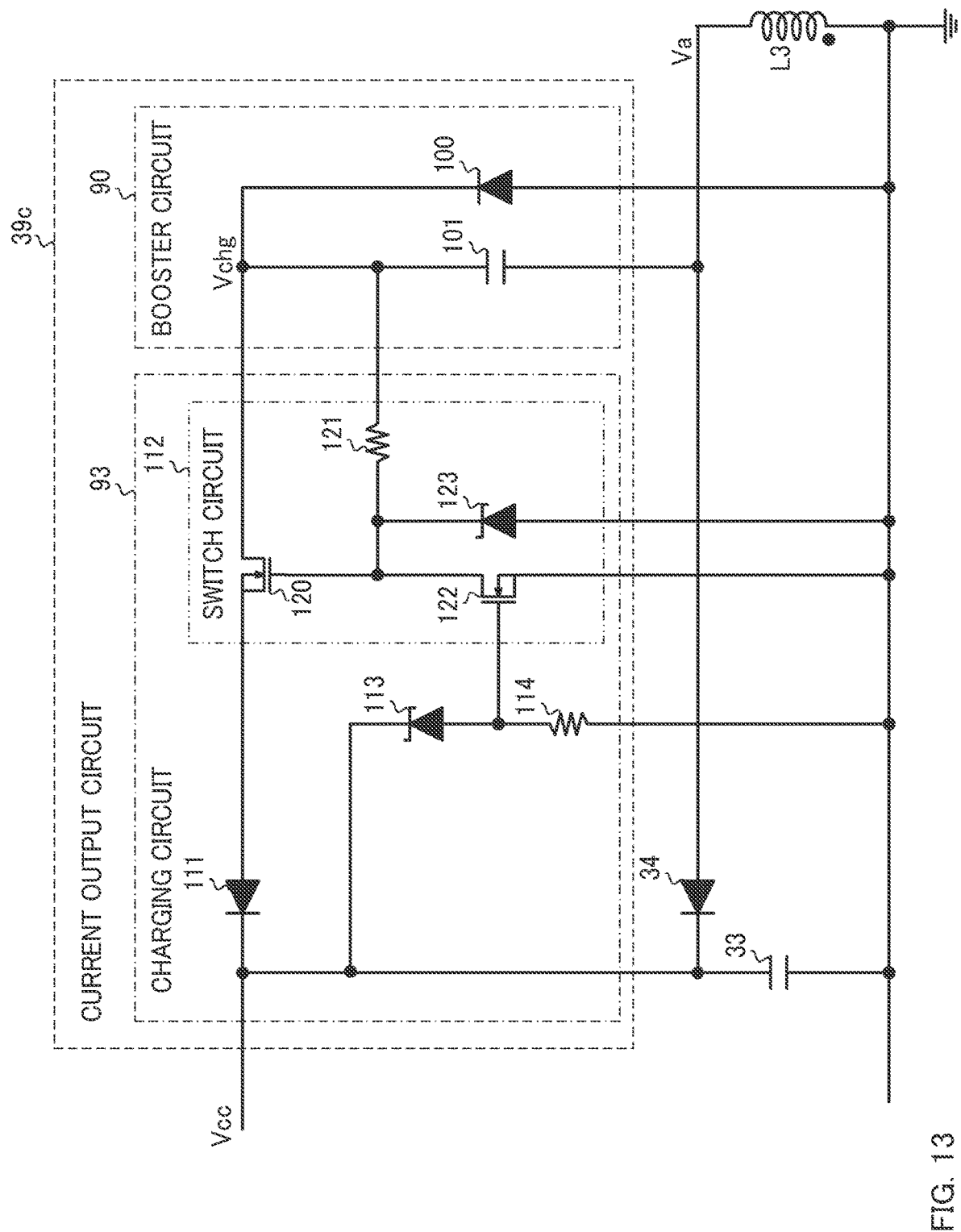
FIG. 13 is a diagram illustrating a configuration example of a current output circuit 39c.

Further, it is assumed in embodiments described above that the current output circuit 39a, 39b is controlled from the control IC 32, however, as illustrated in FIG. 13, a current output circuit 39c may be configured so as to operate properly without being controlled from the control IC 32.

FIG. 13 is a diagram illustrating a configuration example of the current output circuit 39c which is a modification example of the current output circuit 39a. The current output circuit 39c charges the capacitor 33 when the power supply voltage Vcc is low, without receiving the signal from the control IC 32. The current output circuit 39c includes the booster circuit 90 and a charging circuit 93.

The charging circuit 93 charges the capacitor 33 based on the boost voltage Vchg from the booster circuit 90, when the power supply voltage Vcc is low, similarly to the charging circuit 91, 92. The charging circuit 93 includes the diode 111, the switch circuit 112, a zener diode 113, and a resistor 114. The operations of the zener diode 113 and the resistor 114 will be described later.

In the current output circuit 39c in FIG. 13, when the power supply voltage Vcc is higher than a predetermined level, the voltage at the coupling point of the zener diode 113 and the resistor 114 rises, and the NMOS transistor 122 is turned on. Accordingly, the current output circuit 39c does not charge the capacitor 33 with the boost voltage Vchg.

Meanwhile, when the power supply voltage Vcc is lower than the predetermined level, the voltage at the coupling point of the zener diode 113 and the resistor 114 drops, and the NMOS transistor 122 is turned off. Accordingly, the current output circuit 39c charges the capacitor 33 with the boost voltage Vchg.

SUMMARY

The AC-DC converter 10 according to an embodiment of the present disclosure has been described above. The control IC 32 includes the terminal VCC, the terminal FB, the driving signal output circuit 55, the driver circuit 56, and the control circuit 57. The AC-DC converter 10 includes the booster circuit 90, and the charging circuit 91. In this case, the control IC 32 controls the charging circuit 91 so as to charge the capacitor 33 with the boost voltage Vchg, in response to a drop in the power supply voltage Vcc. Thus, the control IC 32 can restrain the power supply voltage Vcc from dropping. Accordingly, it is possible to provide an integrated circuit that restrains a power supply voltage from dropping.

Further, the booster circuit 90 includes the diode 100 and the capacitor 101. The charging circuit 91 includes the switch circuit 110 and the diode 111. When the voltage Va across the auxiliary coil L3 is a negative voltage, the booster circuit 90 charges the capacitor 101 through the diode 100. Further, when the voltage Va is a positive voltage, the booster circuit 90 causes the boost voltage Vchg to be generated across the capacitor 101. This makes it possible to generate the boost voltage Vchg with a simple circuit. Further, the charging circuit 91 can charge the capacitor 33 with the boost voltage Vchg, when the power supply voltage Vcc is lower than the threshold level Vvccl.

Further, the control circuit 57 includes the NMOS transistor 83, and the switch circuit 110 includes the first switch. This makes it possible to control the current output circuit 39a, 39b as to whether the capacitor 33 is to be charged, in response to the signal Son, Son1 from the control IC 32.

Further, the control circuit 57 includes the zener diode 84, and the switch circuit 110 includes the NMOS transistor 120 and the resistor 121. Accordingly, even if the boost voltage Vchg becomes too high, the power supply voltage Vcc results in the voltage corresponding to the zener voltage of the zener diode 84 to be applied to the gate of the NMOS transistor 120, upon turning on of the NMOS transistor 120.

Further, the switch circuit 112 includes the first switch and the second switch. This makes it possible to configure the control circuit 58 with a simple circuit.

Further, the switch circuit 112 includes the NMOS transistors 120 and 122, the resistor 121, and the zener diode 123. Accordingly, even if the boost voltage Vchg becomes too high, the power supply voltage Vcc results in the voltage corresponding to the zener voltage of the zener diode 123 to be applied to the gate of the NMOS transistor 120, upon turning on of the NMOS transistor 120.

Further, the control IC 32 includes the terminal VH and the startup circuit 53. Further, the threshold level Vdssl of the hysteresis comparator 77 in the startup circuit 53 is lower than the threshold level Vvccl of the hysteresis comparator 82 in the control circuit 57, 58. Accordingly, even if the power supply voltage Vcc drops, it is less likely to occur that the current output circuit 39a, 39b operates to thereby charge the capacitor 33 with the current from the startup element 51. This reduces power loss caused by the startup element 51.

The present disclosure is directed to provision of an integrated circuit capable of restraining a power supply voltage from dropping.

According to the present disclosure, it is possible to provide an integrated circuit capable of restraining a power supply voltage from dropping.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that generates an output voltage from an input voltage thereof, to apply the output voltage to a load, the power supply circuit including
a transformer including a primary coil, a secondary coil, and an auxiliary coil,
a transistor configured to control an inductor current flowing through the primary coil,
a first capacitor,
a first diode configured to charge the first capacitor, based on a voltage across the auxiliary coil, upon turning off of the transistor,
a booster circuit configured to generate a boost voltage, based on the voltage across the auxiliary coil, and
a first charging circuit configured to charge the first capacitor,
the integrated circuit being configured to control switching of the transistor, the integrated circuit comprising:
a first terminal configured to receive a voltage across the first capacitor as a power supply voltage;
a second terminal configured to receive a feedback voltage corresponding to the output voltage;
a first output terminal configured to be connected to the transistor; and
a second output terminal configured to be connected to the first charging circuit, the second output terminal being different from the first output terminal;
a driving signal output circuit configured to output a driving signal based on the feedback voltage to increase a switching period of the transistor, in response to a decrease in a load current flowing through the load;
a driver circuit configured to drive the transistor through the first output terminal in response to the driving signal; and
a determination circuit configured to determine whether the power supply voltage drops below a first voltage, and to output a charging control signal to the first charging circuit through the second output terminal, so that the first charging circuit charges the first capacitor, based on the boost voltage, when the power supply voltage is lower than the first voltage.

2. The integrated circuit according to claim 1, wherein
the auxiliary coil has a first end and a second end,
the first capacitor has one end coupled to the first end of the auxiliary coil,
the first diode configured to charge the first capacitor, based on a voltage at the second end of the auxiliary coil,
the booster circuit includes
a second capacitor having
a first end coupled to the second end of the auxiliary coil, and
a second end,
the boost voltage being generated across the second capacitor, and
a second diode configured to charge the second capacitor, based on a voltage at the first end of the auxiliary coil, when the transistor is on, and the first charging circuit includes
a third diode having
an anode, and
a cathode coupled to the first capacitor, and
a switch circuit configured to electrically couple between the second end of the second capacitor and the anode of the third diode, when the power supply voltage is lower than the first voltage.

3. The integrated circuit according to claim 2, wherein
the determination circuit includes a first switch configured to be turned on and off, based on whether the power supply voltage is lower than the first voltage, and
the switch circuit includes a second switch provided between the second end of the second capacitor and the anode of the third diode, the second switch being configured to be turned on and off, based on a state of the first switch.

4. The integrated circuit according to claim 3, wherein
the determination circuit further includes a Zener diode coupled in parallel with the first switch,
the first switch is a first N-channel metal-oxide-semiconductor (NMOS) transistor,
the second switch is a second NMOS transistor having a gate thereof coupled to a drain of the first NMOS transistor, and
the switch circuit further includes a resistor coupling the gate of the second NMOS transistor and the second end of the second capacitor.

5. The integrated circuit according to claim 2, wherein the switch circuit includes
a first switch configured to be turned on and off, based on a determination result of the determination circuit, and
a second switch provided between the second end of the second capacitor and the anode of the third diode, the second switch being configured to be turned on and off, based on a state of the first switch.

6. The integrated circuit according to claim 5, wherein
the first switch is an N-channel metal-oxide-semiconductor (NMOS) transistor having a drain,
the second switch is another NMOS transistor having a gate thereof coupled to the drain of the first switch, and
the switch circuit includes
a first Zener diode coupled in parallel with the first switch, and
a resistor coupling the gate of the second switch and the second end of the second capacitor.

7. The integrated circuit according to claim 1, further comprising:
a third terminal configured to receive a voltage corresponding to the input voltage; and
a second charging circuit configured to charge the first capacitor, based on the voltage at the third terminal, in response to the power supply voltage dropping below a second voltage that is lower than the first voltage.

8. A power supply circuit configured to generate an output voltage from an input voltage thereof, to apply the output voltage to a load, the power supply circuit comprising:
a transformer including a primary coil, a secondary coil, and an auxiliary coil;
a transistor configured to control an inductor current flowing through the primary coil;
a first capacitor;
a first diode configured to charge the first capacitor, based on a voltage across the auxiliary coil, upon turning off of the transistor;
a booster circuit configured to generate a boost voltage, based on the voltage across the auxiliary coil;
a first charging circuit configured to charge the first capacitor; and
an integrated circuit configured to control switching of the transistor, the integrated circuit including
a first terminal configured to receive a voltage across the first capacitor as a power supply voltage,
a second terminal configured to receive a feedback voltage corresponding to the output voltage, a first output terminal connected to the transistor; and
a second output terminal connected to the first charging circuit, the second output terminal being different from the first output terminal;
a driving signal output circuit configured to output a driving signal to change a switching period of the transistor, based on the feedback voltage,
a driver circuit configured to drive the transistor through the first output terminal in response to the driving signal, and
a determination circuit configured to determine whether the power supply voltage drops below a first voltage, and to output a charging control signal to the first charging circuit through the second output terminal, wherein
the first charging circuit is configured to receive the charging control signal and to accordingly charge the first capacitor based on the boost voltage, when the power supply voltage is lower than the first voltage.

9. A power supply circuit configured to generate an output voltage from an input voltage thereof, to apply the output voltage to a load, the power supply circuit comprising:
a transformer including a primary coil, a secondary coil, and an auxiliary coil;
a transistor configured to control an inductor current flowing through the primary coil;
a first capacitor;
a first diode configured to charge the first capacitor, based on a voltage across the auxiliary coil, upon turning off of the transistor;
a determination circuit configured to determine whether a voltage across the first capacitor drops below a first voltage;
a booster circuit configured to generate a boost voltage, based on the voltage across the auxiliary coil;
an integrated circuit configured to control switching of the transistor, the integrated circuit including
a first terminal configured to receive the voltage across the first capacitor as a power supply voltage,
a second terminal configured to receive a feedback voltage corresponding to the output voltage,
a first output terminal connected to the transistor,
a second output terminal different from the first output terminal,
a driving signal output circuit configured to output a driving signal to change a switching period of the transistor, based on the feedback voltage, and
a driver circuit configured to drive the transistor through the first output terminal in response to the driving signal; and
a first charging circuit connected to the second output terminal, the first charging circuit being configured to charge the first capacitor, based on the boost voltage, in response to determination by the determination circuit that the voltage across the first capacitor is lower than the first voltage.

* * * * *